United States Patent
Nagata et al.

(10) Patent No.: US 6,465,996 B2
(45) Date of Patent: Oct. 15, 2002

(54) CONSTANT VOLTAGE CIRCUIT WITH A SUBSTITUTE CIRCUIT IN CASE OF INPUT VOLTAGE LOWERING

(75) Inventors: Junichi Nagata, Okazaki; Kiyoshi Yamamoto, Toyohashi; Hirokazu Itakura, Aichi-ken; Masahiro Kitagawa, Aichi-ken; Hiroyuki Ban, Aichi-ken; Hiroyuki Kawabata, Kariya; Shinichi Maeda, Hekinan, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/799,106

(22) Filed: Mar. 6, 2001

(65) Prior Publication Data

US 2001/0030532 A1 Oct. 18, 2001

(30) Foreign Application Priority Data

| Mar. 8, 2000 | (JP) | 2000-063723 |
| Apr. 21, 2000 | (JP) | 2000-120827 |
| Dec. 1, 2000 | (JP) | 2000-367205 |

(51) Int. Cl.[7] ............................................. G05F 3/16
(52) U.S. Cl. ...................... 323/303; 323/269; 323/274; 323/314
(58) Field of Search ............................. 323/269, 273, 323/274, 303, 314

(56) References Cited

U.S. PATENT DOCUMENTS

| 4,543,522 A | * | 9/1985 | Moreau | 323/274 |
| 4,774,450 A | | 9/1988 | Kitamura | 323/285 |
| 5,025,203 A | * | 6/1991 | Edwards | 323/269 |
| 5,175,487 A | | 12/1992 | Inoue | 323/303 |
| 5,280,233 A | * | 1/1994 | Poletto et al. | 323/269 |
| 5,629,609 A | * | 5/1997 | Nguyen et al. | 323/273 |

FOREIGN PATENT DOCUMENTS

| JP | 57-137012 | 8/1982 | G05F/1/56 |
| JP | 1-270117 | 10/1989 | G05F/1/56 |
| JP | 1-270118 | 10/1989 | G05F/1/56 |
| JP | 2-41512 | 2/1990 | G05F/1/56 |
| JP | 2-194725 | 8/1990 | H03K/17/08 |
| JP | 2-252007 | 10/1990 | G05F/1/56 |
| JP | 4-46571 | 7/1993 | G05F/1/56 |
| JP | 2605854 | 2/1997 | H03K/17/08 |

* cited by examiner

*Primary Examiner*—Jeffrey Sterrett
(74) *Attorney, Agent, or Firm*—Law Offices of David G. Posz

(57) ABSTRACT

A constant voltage circuit robust to the input voltage lowering is disclosed. The invention is applied to a constant voltage circuit fed with an input voltage through first and second power conductors for transferring the input voltage to a load as an output voltage through an output transistor. An inventive constant voltage circuit is provided with a substitute circuit, responsive to a detection of the lowing of the input voltage to a predetermined voltage, for providing a substitute output path that is connected in parallel with the output transistor. Doing this minimize the degree of lowering of the second voltage due to the lowering of said first voltage. The output transistor may be nay of NPN and PNP transistors and P-type and N-type MOS FETs.

8 Claims, 16 Drawing Sheets

CONSTANT VOLTAGE CIRCUIT WITH A SUBSTITUTE CIRCUIT IN CASE OF INPUT VOLTAGE LOWERING

BACKGROUND OF THE INVENTION

1. Field of the Invention

The invention relates to a constant voltage circuit supplied with an input voltage from a primary power supply such as a battery for providing an output voltage more stable than the input voltage.

2. Description of the Prior Art

In motor vehicles for example, various electric loads such as a starter motor, a horn, lights and so on are conventionally connected to a DC power supply or battery. Turning on or off such a load sometimes causes a sudden change of more than a few voltages in the supply voltage (i.e., the battery voltage). This is especially true when an engine of a vehicle the battery of which has experienced a secular deterioration is started under a low temperature. Since electric power is not supplied from the alternator to the battery and the voltage of the battery is lowered in such a case, driving the starter motor will cause the voltage of the power supply to the ECU (electronic control unit) for engine control to lower so extremely that the ECU can not work, preventing the engine from start.

For this reason, it is required to reduce the minimum operating voltage of ECU in order to prevent such problems. The reduction of the minimum operating voltage is required not only to the ECU but also to control devices used under the circumstances in which the power supply voltage is apt to change: e.g., other control devices for vehicle-mounted air conditioner and automatic transmission, control units used in portable devices with a built-in battery, etc.

In such control devices or units, in addition to setting the minimum operating voltage low in each of functional circuits constituting the control device or unit, there is provide a constant voltage circuit which is supplied with electric power from an external DC power supply and generating a predetermined constant voltage in order to prevent the functional circuits from malfunctioning with a sudden change in the power supply voltage. The constant voltage circuit supplies power to each functional circuit.

FIG. 1 shows an exemplary arrangement of a type of conventional constant voltage circuits. In FIG. 1, the CV circuit 1 is supplied with a DC voltage Vb from an external DC supply such as a battery (not shown) from a power feeder line and a ground line. The CV circuit 1 comprises a bias circuit 20a and an output bipolar transistor Q1a of NPN type having its base connected to the output of the bias circuit 20a, its collector connected to the power feeder line (or Vb line) and its emitter connected to the load (not shown). The CV circuit 1 is so arranged as to transfer the input voltage Vb to the load as an output voltage Vo through the output transistor Q1a. (In CV circuits with a bipolar output transistor or CV circuits of type I, the portion other than the output bipolar transistor can be considered as a bias circuit for the output transistor.) The bias circuit 20a comprises a constant current circuit 210 for providing a constant current based on the input voltage Vb, a PNP-type transistor Q21 having its base connected to the constant current circuit 210 output, its emitter connected to the Vb line and its collector connected to the base of the output transistor Q1a, and seven serially coupled diodes D1 through D7 having their anode end connected to the collector of transistor Q21 and the base of the output transistor Q1a and their cathode end connected to ground. Since the seven diodes D1 through D7 function as a clamp circuit for limiting the base voltage of transistor Q1a to a clamp voltage equal to the voltage across the seven diodes in the easy flow direction (i.e., 7×0.7=4.9 V in this example), even when the battery voltage Vb becomes high, the output voltage Vo of the CV circuit 1 is limited to a constant voltage; i.e., the difference by subtracting the base-to-emitter voltage Vf (=0.7 V) of transistor Q1a from the clamp voltage (i.e., 4.2 V in this example).

If the battery voltage Vb is in such a range as not to activate the diodes D1 through D7, i.e., the battery voltage Vb is less than 5 (=Vec1+7×0.7), then the output voltage Vo is given by Vb−Vec1−Vf (=Vb−0.8) V. Assuming that the minimum voltage required by the load is Vreq, then the input DC voltage or battery voltage has to be not less than Vreq+Vec1+Vf. In other words, the control device including the CV circuit 1 and such the load has a minimum operating voltage of Vreq+Vec1+Vf. In this sense, the voltage drop (Vec1+Vf) in the constant voltage circuit is one of the causes of raising the minimum operating voltage of control devices. The voltage drop in the constant voltage circuit becomes critical with the lowering of the input voltage Vb.

FIG. 2 shows an exemplary arrangement of another type of conventional constant voltage circuits which has an output MOS FET (metaloxide semiconductor field-effect transistor). In FIG. 2, N-channel MOS FET Q1b has its drain connected to the power supply Vb line and its source connected to the load (not shown). The CV circuit 2 further comprises a bias circuit 20b or voltage booster 202 having its output connected to the gate of MOS FET Q1b. When the voltage booster 202 is generating a voltage sufficiently higher than the input or battery voltage Vb, MOS FET Q1b operates in a linear region or on state. In this state (referred to as "the completely-on state"), the source-to-drain voltage of MOS FET Q1b is substantially zero, which causes the input voltage Vb to be supplied as it is to the load. Since the drain loss is small and, accordingly, less heat is generated, the completely-on state is a preferable state for the output MOS FET.

On the other hand, as the voltage booster 202 output or the gate voltage lowers with the lowering of the input voltage Vb, MOS FET Q1b eventually enters into a saturation state. In the saturation state, the drain current decreases and the source-to-drain voltage rises with the gate voltage lowering. In this state (referred to as an "incompletely-on state"), the drain loss is larger and, accordingly, more heat is generated, which is an undesirable state for the output MOS FET. In this way, an input voltage lower than the minimum operating voltage of the voltage booster 202 can cause a sudden lowering of the output voltage Vo of the CV circuit 2. (Though the above discussion has been presented in conjunction with a CV circuit having an N-channel MOS FET as the output transistor, the same discussion is applied to a CV circuit having a P-channel MOS FET as the output transistor. CV circuits with an output MOS FET is referred to as "CV circuits of type II").

As seen from the foregoing, there is a need for a constant voltage circuit robust to the input voltage lowering, i.e., a constant voltage circuit in which the output voltage lowers as little as possible with a lowering of the input voltage.

SUMMARY OF THE INVENTION

The above and other problems has been solved in accordance with the present invention which relates to a constant voltage circuit fed with a first voltage through first and second power conductors for supplying a second voltage to a load. A constant voltage circuit comprises an output transistor having a control electrode and having first and second channel electrodes constituting a primary output path to the load. The output transistor has the first channel electrode connected with one of the power conductors, the second channel electrode connected with one end of the load. The other end of the load is connected to the other power conductor that is not connected to the first channel electrode. The constant voltage circuit further comprises a bias circuit for providing a bias voltage to the control electrode to turn on the output transistor and a substitute circuit, responsive to a detection of the lowing of the first voltage to a predetermined voltage, for providing a secondary output path that is connected in parallel with the primary output path. Doing this minimizes the degree of lowering of the second voltage due to the lowering of said first voltage.

The output transistor may be any of NPN and PNP transistors and P-type and N-type MOS FETs.

BRIEF DESCRIPTION OF THE DRAWING

The features and advantages of the present invention will be apparent from the following description of an exemplary embodiment of the invention and the accompanying drawings, in which:

FIG. 5 is a schematic diagram showing an exemplary arrangement of a CV circuit, of type I shown in FIG. 1, which the present invention is has been applied to;

Throughout the drawing, the same elements when shown in more than one figure are designated by the same reference numerals.

DETAILED DESCRIPTION OF THE PREFERRED EMBODIMENTS

Figure 3:
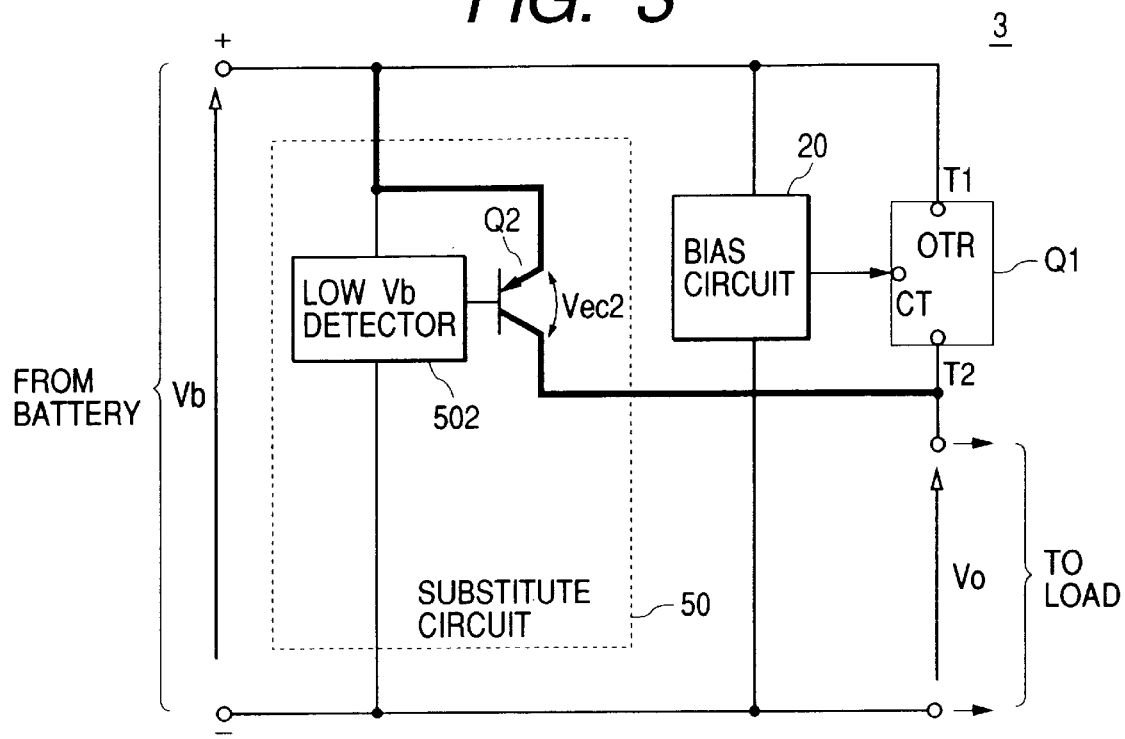
FIGS. 3 and 4 are schematic diagrams showing the basic concepts of the invention.
Figure 4:
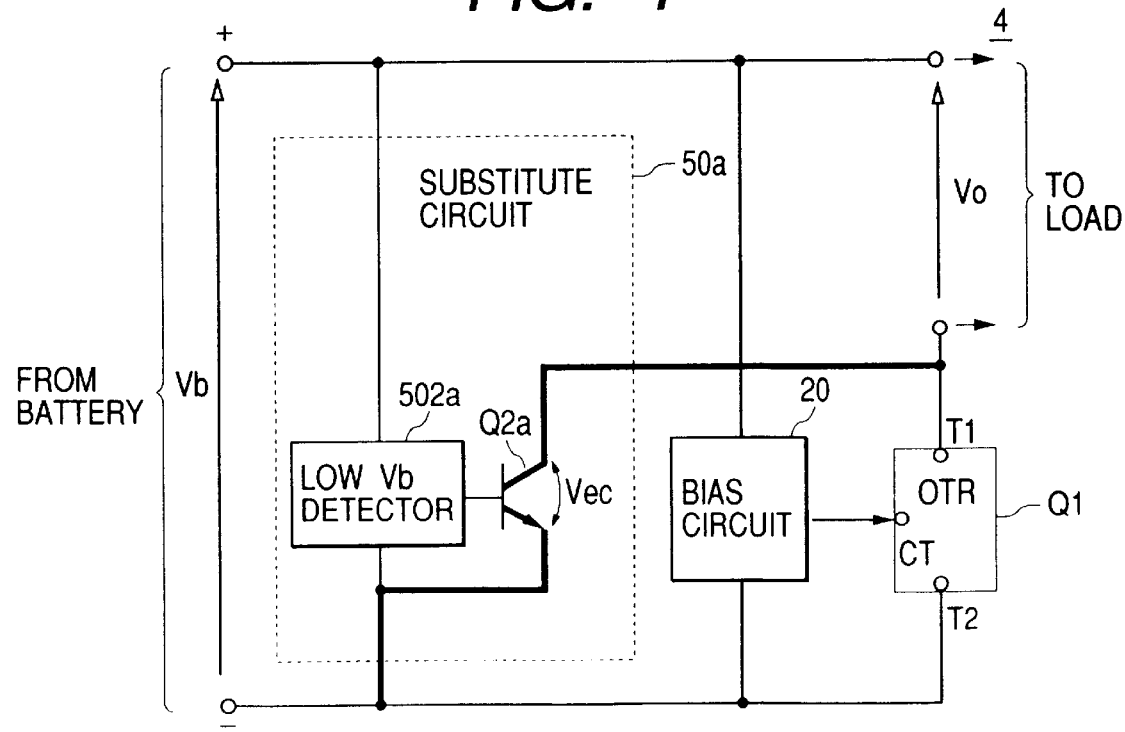

FIGS. 3 and 4 are schematic diagrams showing the basic concepts of the invention. The present invention is applicable to a constant voltage circuit which comprises an output transistor Q1 for transferring the input voltage Vb to the load connected thereto as an output voltage Vo through the current path provided by the terminals T1 and T2 thereof and a bias circuit 20 for providing the bias voltage to the control gate of the output transistor Q1 as shown in FIGS. 3 and 4. The load (not shown) may be connected to either between the T2 terminal of the transistor Q1 and the lower-potential side (labeled with a symbol "−" and referred to as "the NPS line") of the input voltage lines as shown in FIG. 3 or between the higher-potential side (labeled with a symbol "+" and referred to as "the PPS line") of the input voltage lines and the T1 terminal of the transistor Q1 as shown in FIG. 4. The output transistor Q1 may be either a bipolar (in case of a CV circuit of type I) or a MOS FET (in case of a CV circuit of type II).

According to the invention, a constant voltage (CV) circuit 3 or 4 further comprises a substitute circuit 50 or 50a for providing a substitute power feeder path which substitutes for the current path through terminals T1 and T2 of the output transistor Q1 if the input voltage Vb lowers to a predetermined level.

In FIG. 3, the substitute circuit 50 comprises a second output transistor Q2 of PNP type having its emitter connected to the PPS line and its collector connected to the T2 terminal of transistor Q1 and the load. The circuit 50a further comprises a low Vb detector 502 having its output connected to the base of the second output transistor Q2. As long as the input voltage Vb is not lower than a predetermined level, the low Vb detector 502 provides a higher level output to keep the transistor Q2 off. In this case, the input voltage Vb is transferred to the not-shown load as an output voltage Vo through transistor Q1. If the input voltage Vb becomes lower than a predetermined level, then the low Vb detector 502 makes its output level low (preferably as low as the NPS line), which causes the transistor Q2 to turn on to provide a substitute power feeder path indicated by bold lines through transistor Q2. Since the emitter-to-collector voltage Vec2 is typically 0.1 V, the output voltage Vo equal to the input voltage Vb minus only 0.1 V is supplied to the load through the substitute power feeder path.

In FIG. 4, the substitute circuit 50a comprises a second output transistor Q2a of NPN type having its emitter connected to the NPS line and its collector connected to the T1 terminal of transistor Q1 and the load. The circuit 50a further comprises a low Vb detector 502a having its output connected to the base of the second output transistor Q2a. As long as the input voltage Vb is not lower than a predetermined level, the low Vb detector 502a provides a low level output to keep the transistor Q2 off. In this case, the input voltage Vb is transferred to the not-shown load as an output voltage Vo through transistor Q1. If the input voltage Vb becomes lower than a predetermined level, then the low Vb detector 502a makes its output level high, which causes the transistor Q2 to turn on to provide a substitute power feeder path indicated by the bold lines through transistor Q2a. Again, the output voltage Vo equal to the input voltage Vb minus only 0.1 V is supplied to the load through the substitute power feeder path.

Figure 1:
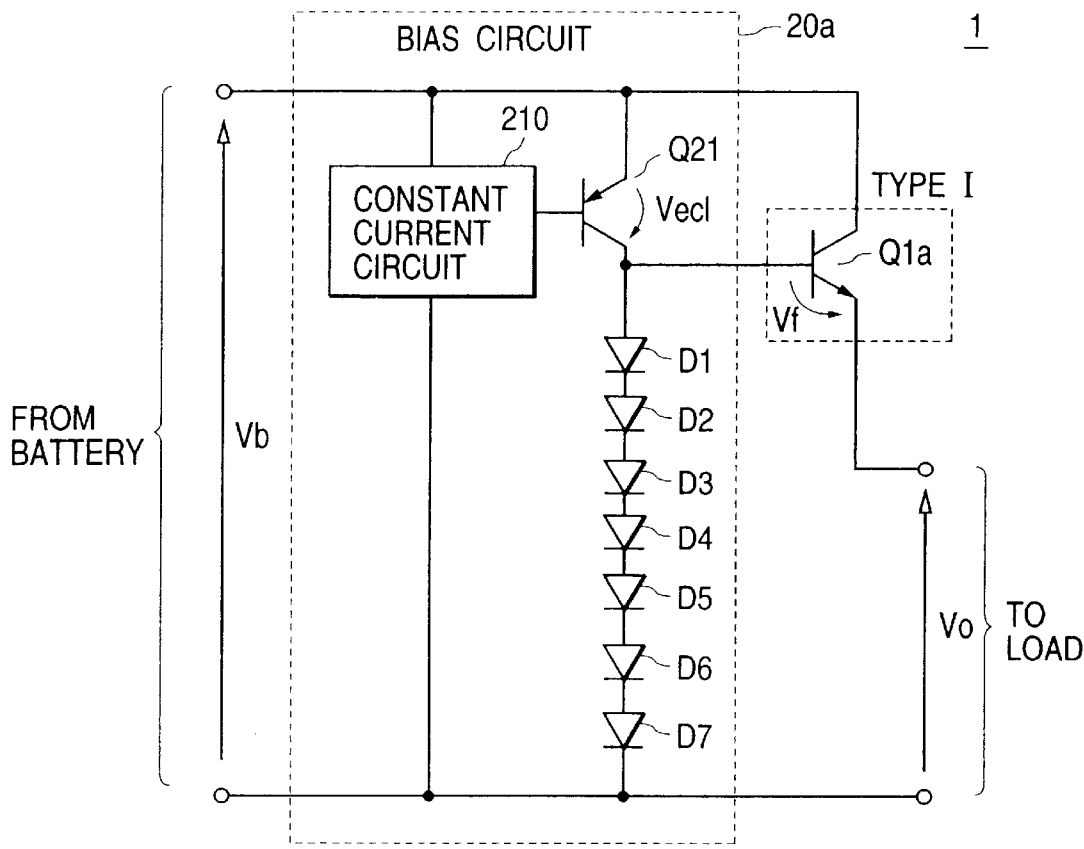
FIGS. 1 and 2 are schematic diagrams showing exemplary arrangements of two types of conventional constant voltage circuits.
Figure 5:
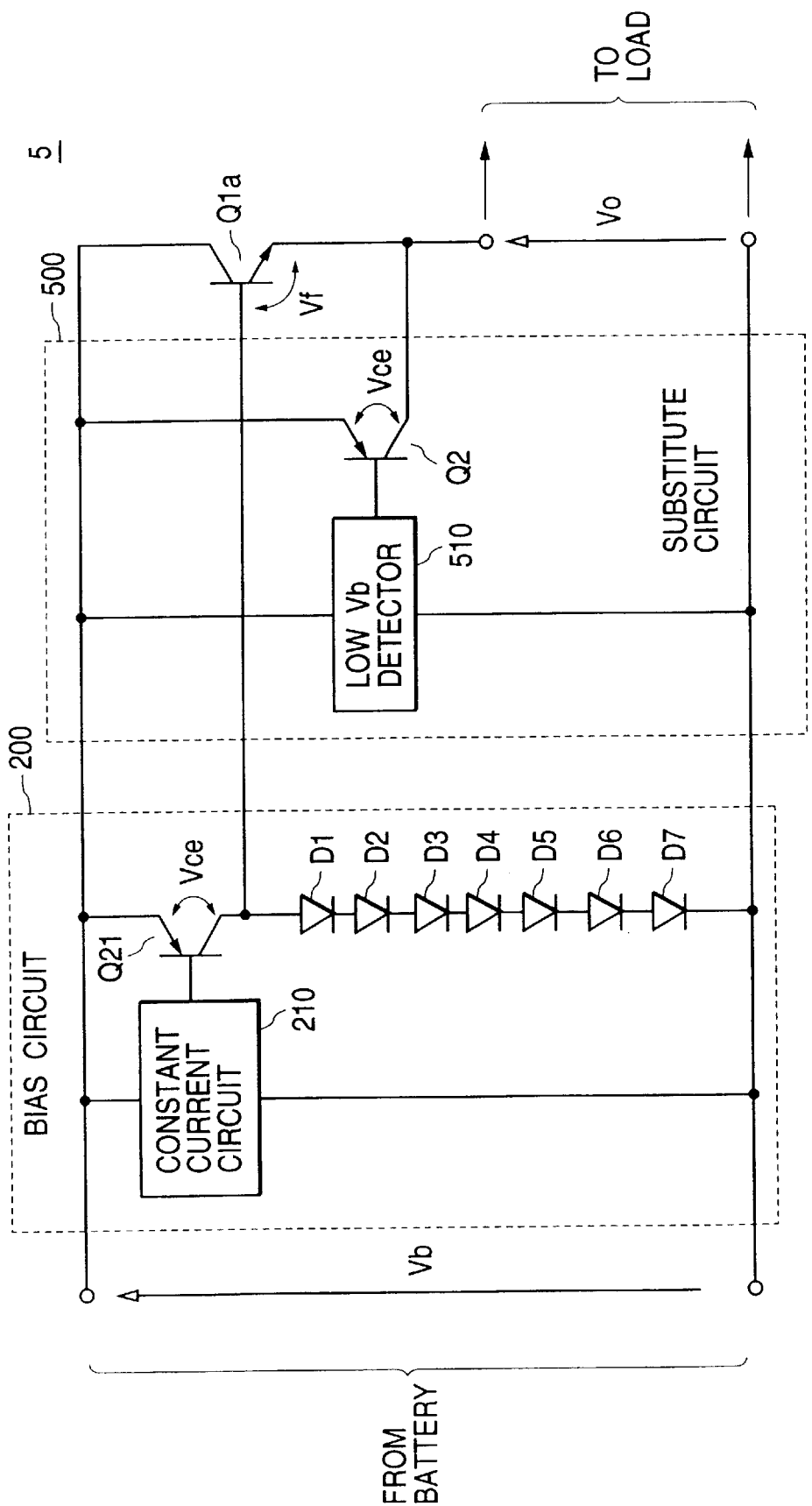
Figure 6:
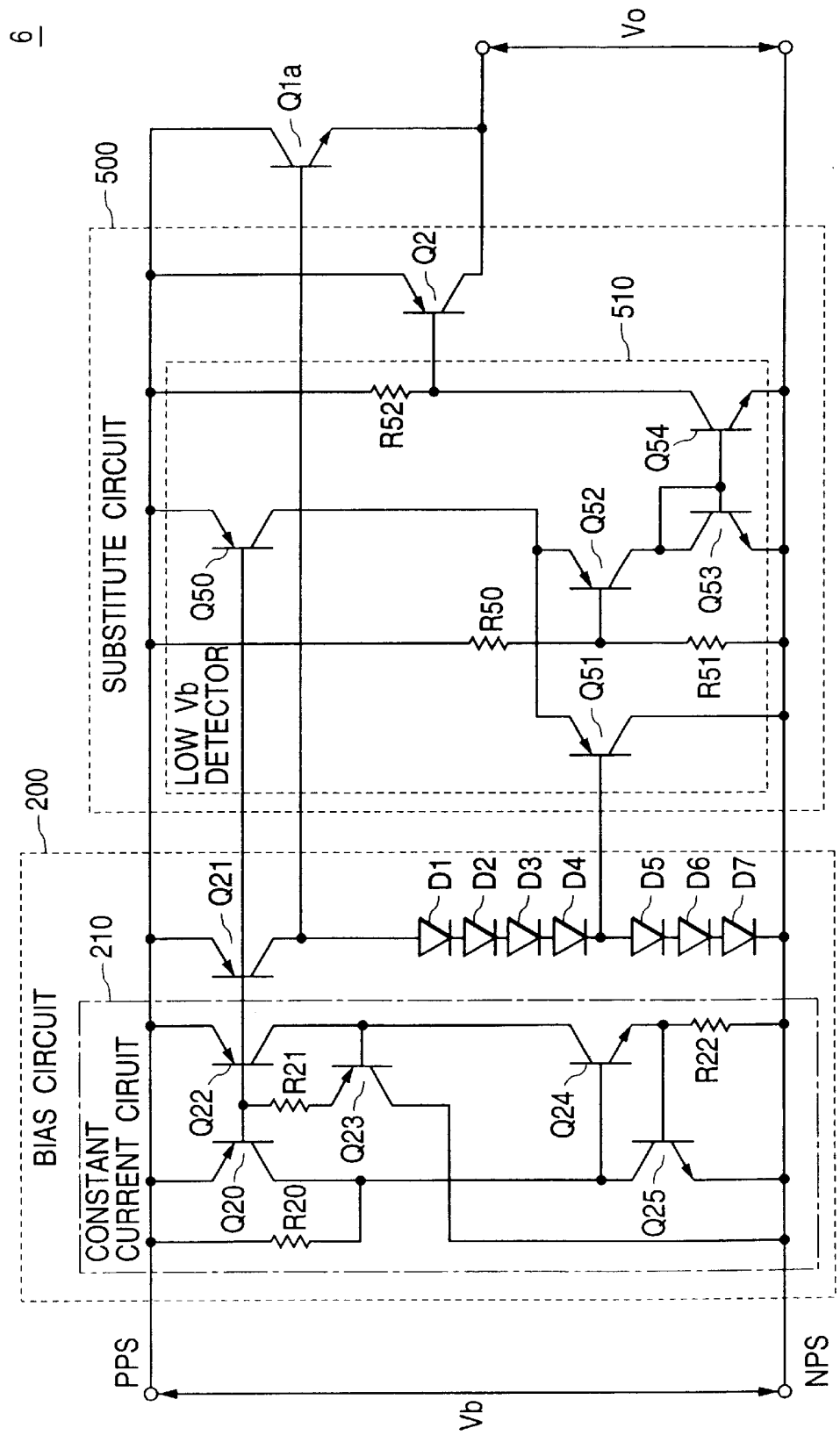
FIG. 6 is a diagram showing the details of a CV circuit of type I in accordance with a first illustrative embodiment of the invention as shown in FIG. 5.

Applying the above-described concept of the invention shown in FIG. 3 to the CV circuit 1 of type I shown in FIG. 1, we obtain a CV circuit of FIG. 5. In FIG. 5, the bias circuit 20a has been replaced with a circuit 200, and the substitute circuit 50 has been replaced with a circuit 500. FIG. 6 is a diagram showing the details of a CV circuit of type I in accordance with a first illustrative embodiment of the invention as shown in FIG. 5. The CV circuit 6 of FIG. 6 is usually built in an integrated circuit constituting a vehicle-mounted electronic control unit such as an engine ECU. The CV circuit 6 is supplied with a power from a vehicle-mounted battery (or a DC power supply).

In FIG. 6, the constant current circuit 210 comprises PNP-type transistors Q20 and Q22 having their emitters connected to the PPS line and their bases connected with each other; a resistor R20 connected between the PPS line and the collector of Q20; a PNP transistor Q23 having its base connected to the collector of Q22 and its collector connected to the NPS line; a resistor R21 connected between the emitter of Q23 and the node between the bases of Q20 and Q22; an NPN transistor Q24 having its collector connected to the base of Q23 and the collector of Q22; an NPN transistor Q25 having its emitter connected to the NPS line, its collector connected to the collector of Q20, the base of Q24 and one end of resistor R20; and a resistor R22 having its one end connected to the NPS line and the other end connected to the emitter of Q24 and the base of Q25.

The low Vb detector 510 comprises a PNP transistor Q50 having its emitter connected to the PPS line and its base connected to the bases of PNP transistors Q20 through Q22 to constitute a current mirror which makes transistor Q20 primary; a PNP transistor Q51 having its base connected to the node between diodes D4 and D5 and its collector connected to the NPS line; a PNP transistor Q52 having its emitter connected to the collector of Q50 and the emitter of Q51; resistors R50 and R51 having their one ends connected together to the base of Q52 having the other ends connected to the PPS and NPS lines, respectively; an NPN transistor Q53 having its emitter connected to the NPS line; an NPN transistor Q54 having its emitter connected to the NPS line and its base connected with the collector of Q52 and the base and the collector of Q53 into a single node; and a resistor R52 having its one end connected to the PPS line and the other end connected to the collector of Q54 to form the output node of the low Vb detector 510, which node is further connected to the base of the output transistor Q2 of the substitute circuit 500.

In operation, if an input voltage Vb is supplied to between the PPS and NPS lines and if the input voltage Vb is larger than a minimum voltage required for the operation of transistors Q24 and 25 (i.e., 2·Vf), then base currents begins to be supplied to transistors Q24 and Q25 through resistor R20 to turn on Q24 and Q25. This causes the transistors Q20 through Q22 and Q50 which constitute a current mirror circuit to conduct respective current. The output voltage Vo is provided between the output node of the collectors of Q1a and Q2 and the NPS line in a manner described in conjunction with FIG. 1.

In the low Vb detector 510, a constant current controlled by the constant current circuit 210 is supplied through the collector of Q50 to the emitters of transistors Q51 and Q52. In the above-described configuration, one of transistors Q51 and Q52 the base voltage of which is lower becomes on. In other words, since the base voltages V51 of Q51 is limited to the reference voltage of 3·Vf by diodes D5 through D7 and the base voltages V52 of Q52 is given as V52=Vb·R51/(R50+R51), if base voltage V52 is smaller than base voltage V51; i.e., the input voltage Vb is smaller than a predetermined voltage of 3·Vf (R50+R51)/R51, then transistor Q52 is in the on state, while transistor Q51 is in the off state (low Vb operation). Otherwise, transistor Q52 is in the off state, while transistor Q51 is in the on state (normal Vb operation).

In normal Vb operation or in case of transistor Q51 being on, the current supplied from transistor Q50 flows through Q51 to ground or the NPS line. This causes transistors Q53, Q54 and Q2 to become off. Accordingly, the substitute power feeder path which runs through transistor Q2 as shown in bold lines in FIG. 3 is not formed.

In low Vb operation or in case of transistor Q52 being on, the current supplied from transistor Q50 flows through transistors Q52 and Q53, which turns transistors Q54 and Q2. Since transistor Q2 is turned on, the substitute power feeder path which runs through transistor Q2 is formed as shown in bold lines in FIG. 3.

Figure 8:
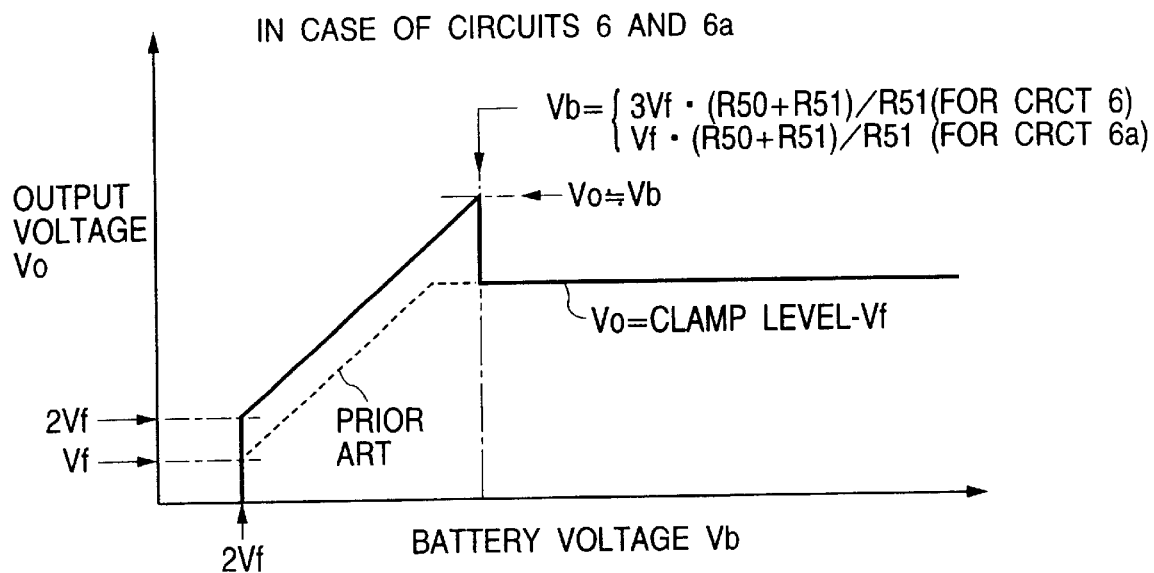
FIG. 8 is a graph showing an input-to-output characteristic for the CV circuits 6 and 6a of FIGS. 6 and 7.

FIG. 8 is an input-to-output voltage characteristic curve which shows how the CV circuit 6 (and a CV circuit 6a to be described later) operates. The abscissa indicates the input or battery voltage Vb and the ordinate indicates the output voltage Vo. If the battery voltage Vb is larger than the minimum operation voltage of the constant current circuit 210 (i.e., 2·Vf) and smaller then the above-mentioned predetermined voltage, i.e., 3·Vf·(R50+R51)/R51, then, through transistor Q2, there is provided the output voltage Vo which equals to the input voltage Vb minus the emitter-to-collector voltage Vec2 of Q2 (=Vb−Vec2=Vb−0.1 V) as shown in a solid line in FIG. 8. On the other hand, in the prior art as shown in a broken line, the output voltage Vo is limited to a voltage given by Vb−(Vec1+Vf), where Vec1 is the emitter-to-collector voltage of Q2 and Vf is the base-to-emitter voltage of the output transistor Q1a for an input voltage Vb which is not less than the minimum operation voltage 2·Vf of the constant current circuit 210 and which does not exceed such a voltage as to cause diodes D1 through D7 to start clamping the base voltage of the output transistor Q1a. That is, a CV circuit 6 according to the invention provides an output voltage higher than that of the prior art by Vf (=0.7) volts in the low Vb operation, i.e., an inventive CV circuit 6 is more robust to a lowering of Vb. Using inventive CV circuits 6 in control devices enables the reduction of the minimum operation voltage of the control devices.

In the normal Vb operation, in which the input voltage Vb is larger than the predetermined voltage 3·Vf·(R50+R51)/R51 and transistor Q2 is turned off, the constant voltage Vo is output through output transistor Q1a as is the case in the prior art.

It should be noted that the predetermined voltage 3·Vf·(R50+R51)/R51 is preferably set to a value larger than the clamp voltage, i.e. 7·Vf by adjusting the values of resistors R50 and R51. If the predetermined voltage is set smaller than 7·Vf, then, while rising with the increase in the input voltage Vb, the output voltage Vo is suddenly falls to a level on the broken line.

Figure 7:
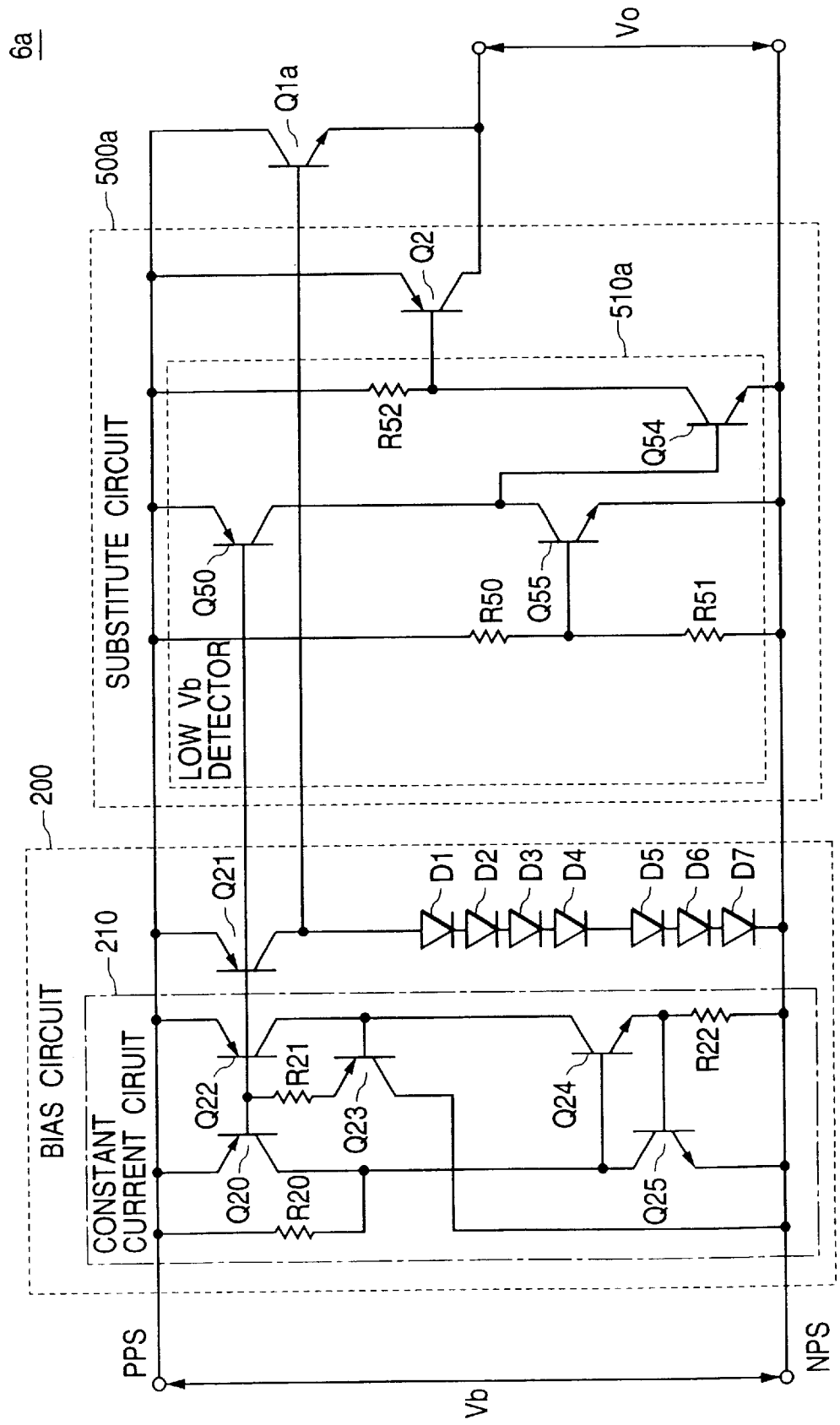
FIG. 7 is a diagram showing an exemplary modification of the CV circuit of FIG. 6.

FIG. 7 is a diagram showing an exemplary modification of the CV circuit 6 of FIG. 6. The CV circuit of FIG. 7 is identical to that of FIG. 6 except that the low Vb detector 510 (and, accordingly, the substitute circuit 500) has been replaced with a circuit 510a (and, accordingly, a circuit 500a). Specifically, in the low Vb detector 510a, the base-to-emitter and collector electrodes of transistor Q52 have been replaced with the base, collector and emitter electrodes of transistor Q55, respectively; transistor Q53 has been removed; the emitter of Q55 has been connected to the NPS line; and the base of transistor Q54 has been connected to the collectors of Q50 and Q55.

In this configuration, transistor Q55 turns on when the voltage drop across resistor R51 reaches Vf as the input voltage Vb increases from a sufficiently low level. Since the voltage drop across resistor R51 is given by Vb·R51/(R50+R51), transistor Q55 is off if the input voltage Vb is lower than a second predetermined voltage Vf·(R50+R51)/R51 (in case of low Vb operation) and is on otherwise (in case of normal Vb operation).

If transistor Q55 is in the on state (or in case of normal Vb operation), then the current supplied from transistor Q50 all flows to the NPS line through Q55, which causes transistors Q54 and Q2 to become off. Accordingly, the substitute power feeder path which runs through transistor Q2 is not formed.

If transistor Q55 is in the off state (or in case of low Vb operation), then the current supplied from transistor Q50 flows to the NPS line through transistor Q54, which causes transistors Q54 and Q2 to become on. Accordingly, the substitute power feeder path which runs through transistor Q2 is formed.

In this CV circuit 6a, the second predetermined voltage Vf·(R50+R51)/R51 is preferably set to a value larger than the clamp voltage, i.e., 7·Vf by adjusting the values of resistors R50 and R51. By doing this, it is possible to prevent the output voltage Vo from suddenly falling to a level on the broken line and to let the output voltage Vo fall to the clamp level minus Vf as the input voltage Vb rises from a sufficiently low level as shown in FIG. 8.

Figure 9A:
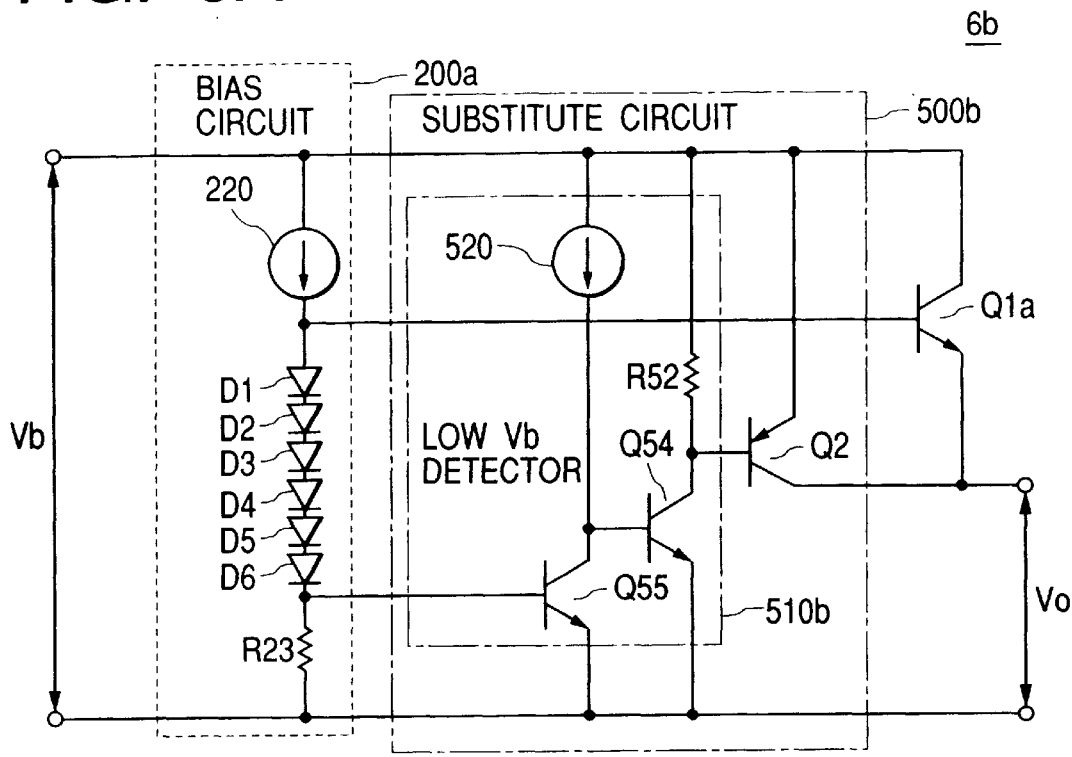
FIGS. 9A and 9B are diagrams showing exemplary modifications of the CV circuit of FIG. 7.
Figure 9B:
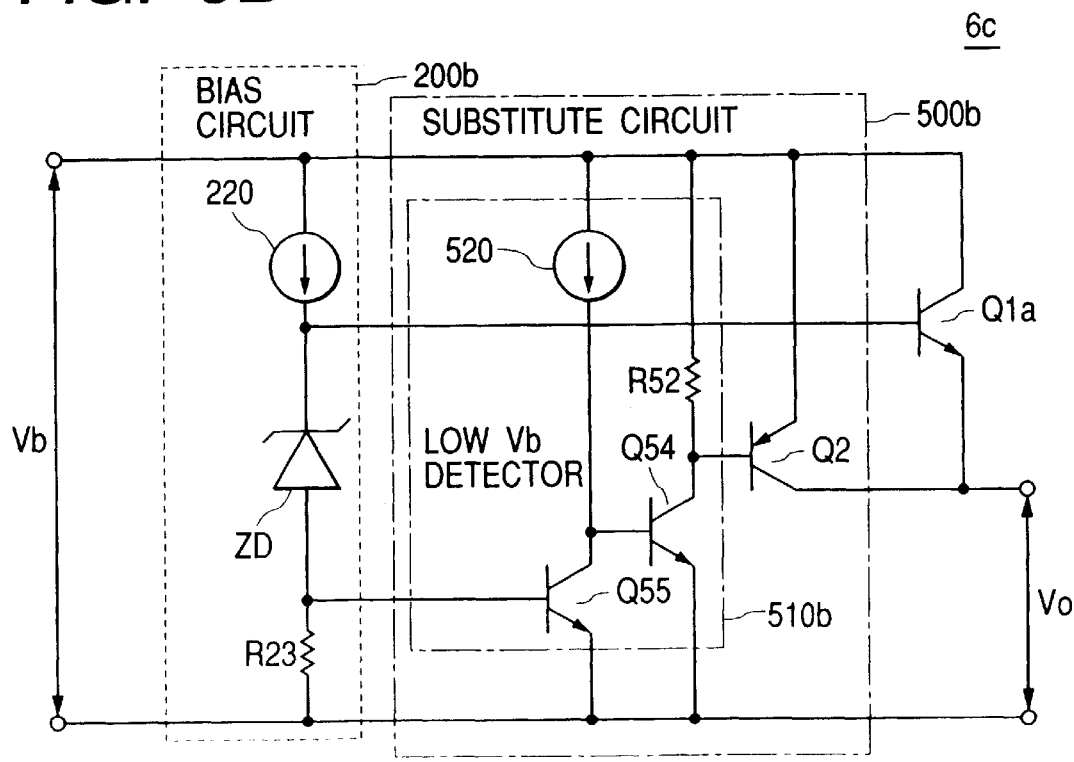

FIGS. 9A and 9B are diagrams showing exemplary modifications of the CV circuit of FIG. 7. For the sake of the simplicity, the combination of constant current circuit 210 and transistor Q21 is denoted by a constant current source 220, and the combination of constant current circuit 210 and transistor Q50 is denoted by a constant current source 520 in FIGS. 9A and 9B. Taking this into account, it is seen that the CV circuit of FIG. 9A is identical to that of FIG. 7 except that, in FIG. 9A, resistors R50 and R51 has been removed; diode D7 has been replaced with a resistor R23; and the base of transistor Q55 has been connected to a node between diode D6 and resistor R23. Responsively, the bias circuit, the low Vb detector and the substitute circuit which include R24 and R53 have had their element numerals changed from 200, 510a and 500a to 200a, 510b and 500b, respectively.

Figure 10:
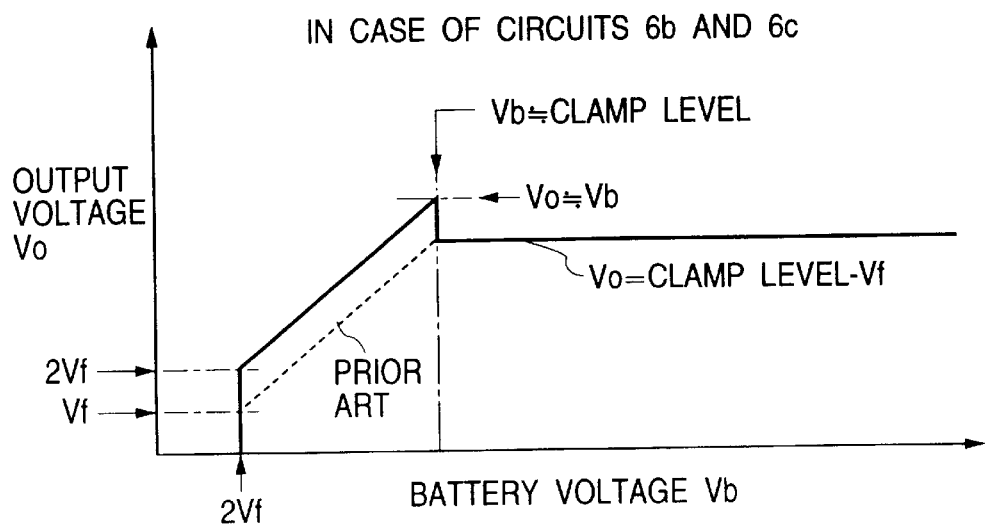
FIG. 10 is a graph showing an input-to-output characteristic for the CV circuits 6b and 6c of FIGS. 9A and 9B.

FIG. 10 is an input-to-output voltage characteristic curve which shows how the CV circuits 6b and 6c operate. For the input voltage Vb lower than the minimum operation voltage (2·Vf) of the constant current sources 220 and 520 (i.e., the constant current circuit 210), both of output transistor Q1a and transistor Q54 are in the off state. If the input voltage Vb goes higher from this state to reach the minimum operation voltage, then transistors Q1a and Q54 turn on. Since the on state of Q54 causes transistor Q2 to turn on, the voltages of the collector and the emitter of Q1a becomes substantially equal to each other and accordingly transistor Q1a becomes off. The output voltage Vo substantially equal to the input voltage Vb (specifically, the input voltage Vb minus the emitter-to-collector voltage of Q2; i.e., Vb−0.1 V) is supplied to the load through transistor Q2.

When the base voltage of transistor Q1a reaches the easy-flow direction voltage 6 ÅEVf (=4.2 V) across six diode D1 through D6 with the rising of the input voltage Vb, the series circuit leg including diodes D1 through D6 and resistor 23 starts to conduct. With the increase in the base voltage of Q1a, the voltage across resistor R23 reaches the base-to-emitter voltage or, in other words, the base voltage of output transistor Q1a becomes the sum of six anode-to-cathode junction voltage and one base-to-emitter voltage drop of Q55, which sum is referred to as "clamp voltage" and is equal to 7×Vf (=4.7 V). This causes transistor Q55 to conduct the current from the constant current source 520 to ground; thereby making transistors Q54 and Q2 off. In this state, the output voltage equal to the clamp voltage minus one base-to-emitter voltage drop is supplied to the load through the output transistor Q1a as shown in a broken line in FIG. 10.

As seen from above, CV circuit 6b provides an output voltage one base-to-emitter voltage drop higher than that of the prior art in low Vb (or input) voltage operation. Thus, CV circuit 6b has immunity against lowerings in the magnitude of the input power supply voltage.

Only one difference between CV circuits 6b (FIG. 9A) and 6c (FIG. 9B) is that the six diodes D1 through D6 have been replaced with a Zener diode ZD in CV circuit 6c of FIG. 9B (Responsively, the element numeral of the bias circuit has been changed from 200a (FIG. 9A) to 200b (FIG. 9B)). Therefore, all of the above description can be applied to CV circuit 6c.

It is noted that replacing serially connected diodes with a Zener diode having a Zener voltage equal to the sum of the anode-to-cathode junction voltages across the serially connected diodes may be applied to the diodes of FIGS. 5 and 7 and diodes D1 through D4 and diodes D5 through D7 of FIG. 6.

Figure 11:
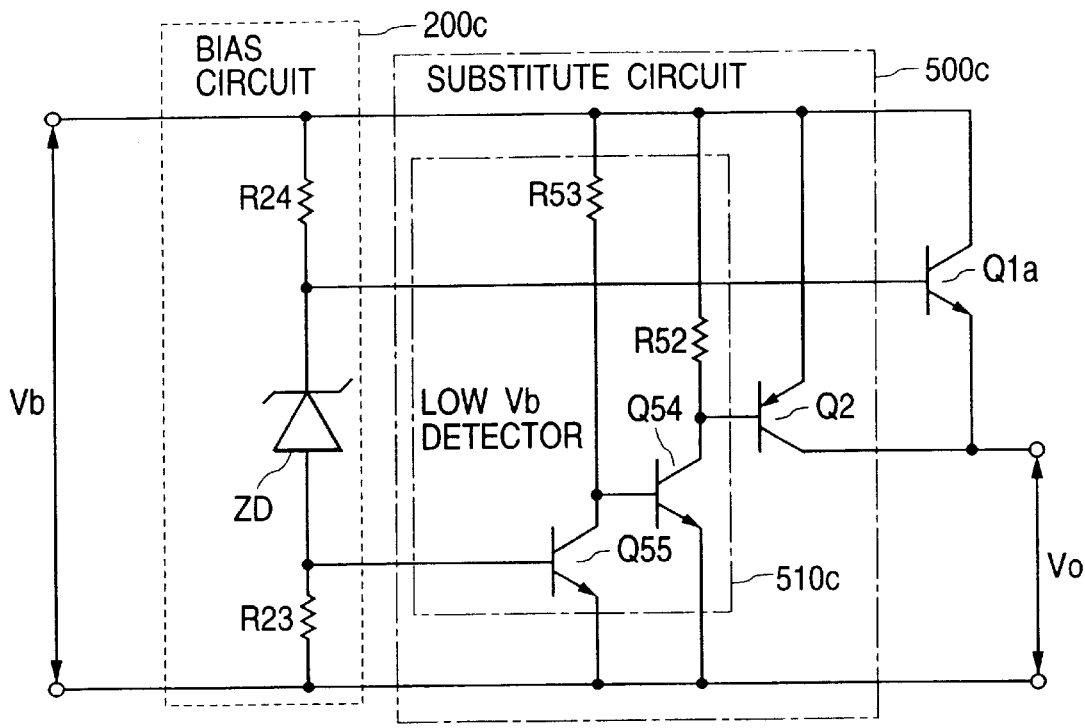
FIG. 11 is a diagram showing an exemplary modification of the CV ircuit 6c of FIG. 9B.

FIG. 11 is a diagram showing an exemplary modification of the CV circuit 6c of FIG. 9B. Only one difference between CV circuits 6d (of FIG. 11) and 6c (FIG. 9B) is that the constant current source 220 and 520 have been replaced with resistors R24 and R53 in CV circuit 6d of FIG. 11. Responsively, the bias circuit, the low Vb detector and the substitute circuit which include R24 and R53 have had their element numeral changed from 200b, 510b and 500b to 200c, 510c and 500c, respectively.

Figure 12:
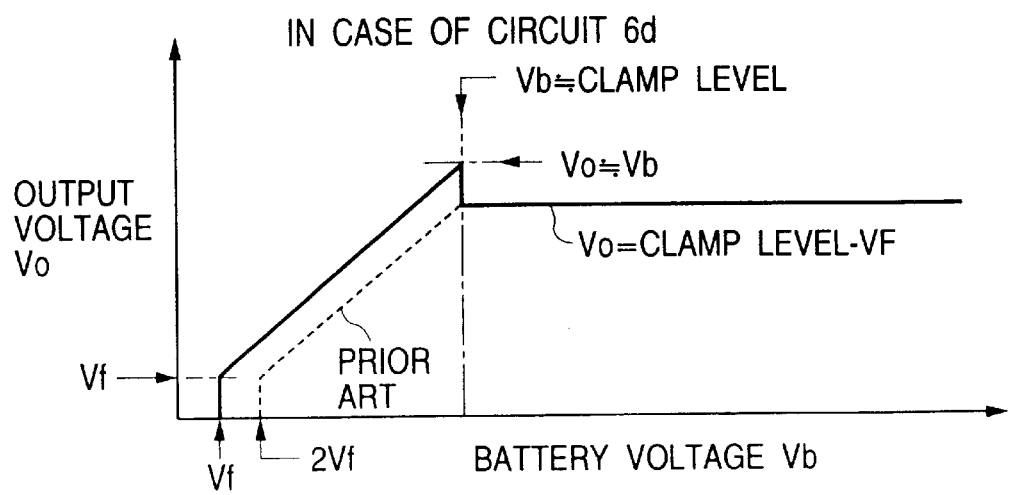
FIG. 12 is a graph showing an input-to-output characteristic for the CV circuits 6d of FIG. 11.

The operation of CV circuit 6d is also identical to that of CV circuit 6c except that since the base electrodes of output transistors Q1a and Q2 are connected to the input voltage Vb conductor through resistors R24 and R53, respectively, output transistors Q1a and Q2 can start their operation when the input voltage Vb is equal to or higher than the base-to-emitter voltage Vf. Consequently, if an input voltage Vb is in a range from the base-to-emitter voltage Vf to the clamp voltage (i.e., the sum of the Zener voltage and one base-to-emitter voltage drop), the output voltage is supplied to the load through output transistor Q2 of the substitute circuit 500c as shown in FIG. 12.

Figure 13A:
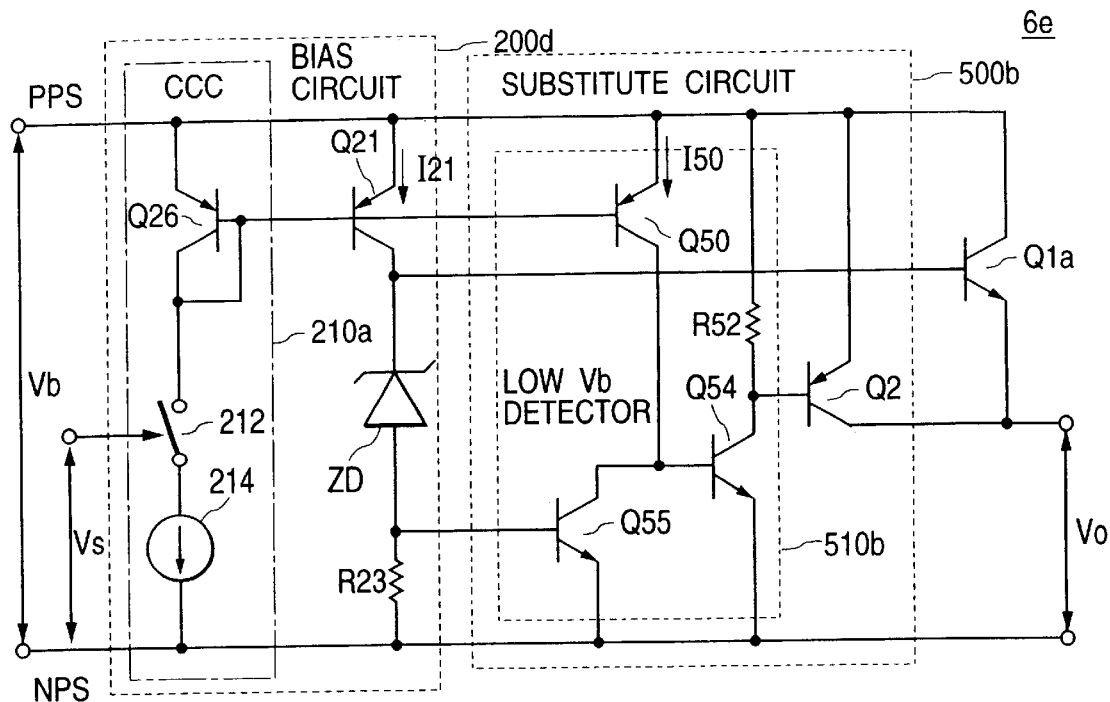
FIGS. 13A and 13B are diagrams showing exemplary modifications 6e and 6f of the CV circuit 6c of FIG. 9B, wherein modification 6e involves a problem, which has been settled in modification 6f.
Figure 13B:
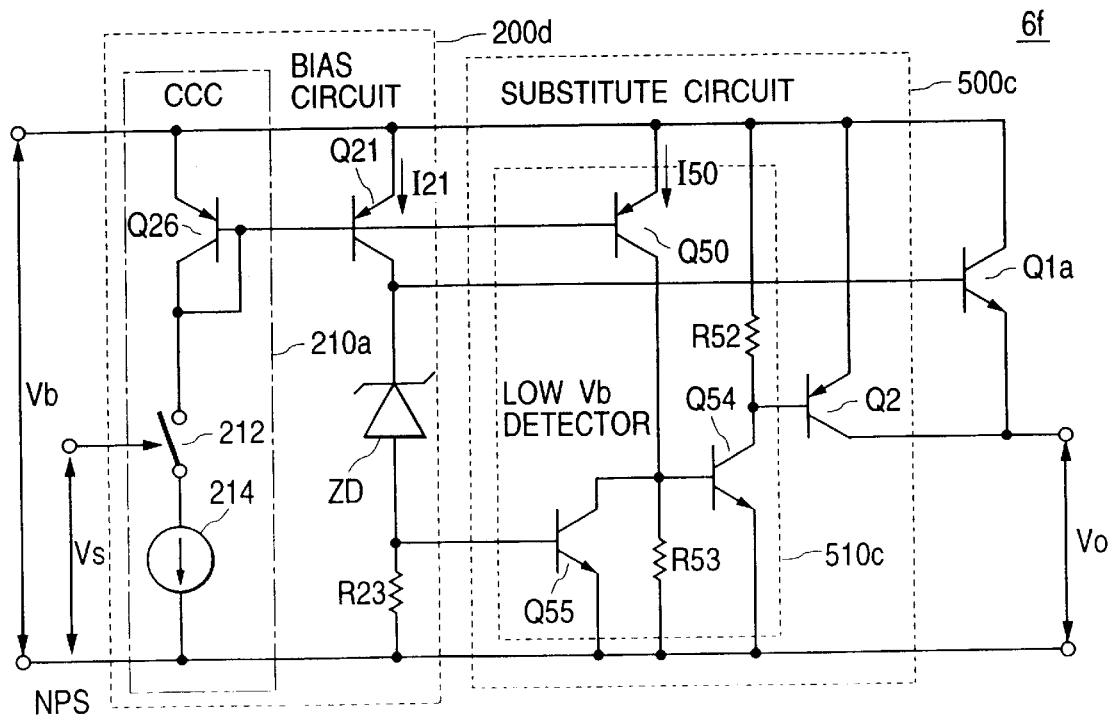

FIGS. 13A and 13B are diagrams showing exemplary modifications 6e and 6f of the CV circuit 6c of FIG. 9B. The modification 6e is a CV circuit provided with the so-called sleep function, which enables the reduction of power consumption in CV circuit when there is no need of supplying a constant voltage to the external load. In FIG. 13A, CV circuit 6e comprises a bias circuit 200d, the output transistor Q1a for providing the output voltage under the control of the bias voltage from the bias circuit 200d, and the substitute circuit 500b which is the same as that used in FIGS. 9A and 9B. The bias circuit 200d differs from the bias circuit 200b of FIG. 9B in that the constant current circuit 210 which is thought to be included in the constant current source 220 has been replaced with constant current circuit (CCC) 210a in the bias circuit 200d. Since the portion other than CCC 210a has been described above, we only describe CCC 210a.

The constant current circuit 210a comprises a PNP transistor Q26 having its emitter pulled up to the PPS conductor and its base connected to its collector and the bases of transistors Q21 and Q50 to forming a current mirror circuit; an on/off switch 212 having one end of the switched channel thereof connected to the node including the collector of Q26 and its control terminal supplied with a control signal Vs; and a constant current source 214 having its anode connected to the other end of the switched channel of the switch 212 and its cathode connected to the NPS conductor. The switch 212 is comprised of; e.g., a switching transistor. The control signal Vs is supplied by a not-shown controller for example.

If the control signal of high level for example is applied to the control terminal of the switch 212, the switch 212 provides a current path connecting the collector of Q26 with the constant current source 214 anode to allowing constant current source 214 to draw a constant current through Q26 from the PPS conductor. Conversely, applying a low-level control signal to the control terminal of the switch 212 causes switch 212 to disable constant current source 214 to draw the constant current through Q26 from the PPS conductor.

Accordingly, applying a high-level control signal to the control terminal of the switch 212 causes CCC 210a to supply a constant current to transistors Q21 and Q50 as constant current circuit 210 does in FIG. 7 (and in bias circuit 200b of FIG. 9B); thereby causing CV circuit 6e to operate in the same manner as CV circuit 6c of FIG. 9B.

Conversely, applying a low-level control signal to the control terminal of the switch 212 deactivates transistor Q26 (i.e., the current source of the current mirror circuit) and, accordingly, or transistors Q21 and Q50 (i.e., the current sinks of the current mirror circuit), which in turn deactivates output transistors Q1a and Q2. Thus, CV circuit 6e enters into a sleep mode in which neither Q1a nor Q2 provides output voltage Vo. In this sleep mode, all of the elements constituting CV circuit 6e conduct no current, which means that the power consumption by CV circuit 6e is zero.

However, this CV circuit 6e involves a problem that the output voltage may temporarily jump up to the level of input voltage Vb when the mode is changed from the normal mode in which CV circuit 6e normally supplies output voltage Vo to the sleep mode as described in the following.

Figure 14A:
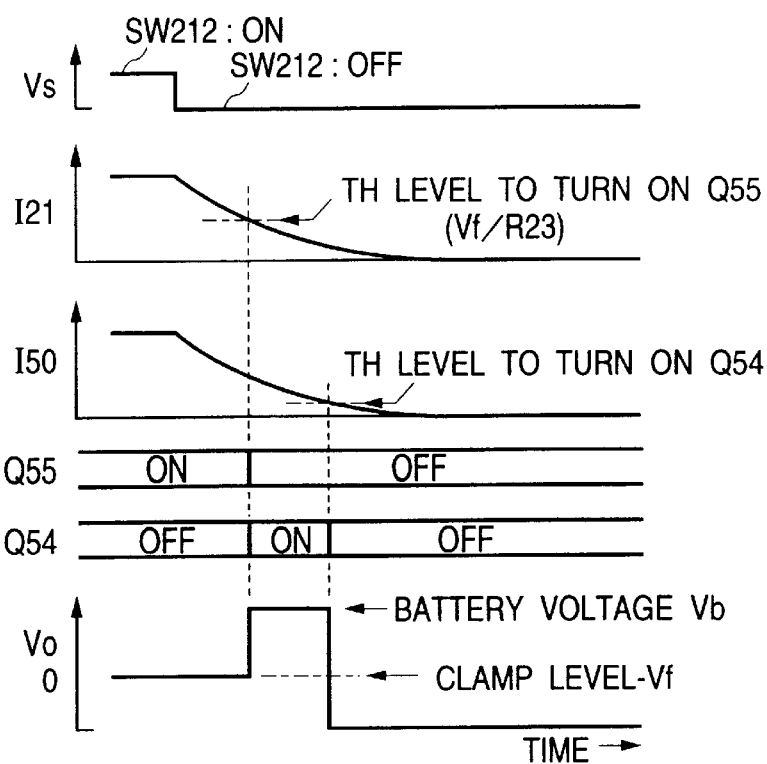
FIGS. 14A and 14B are graphs showing input-to-output characteristics for the CV circuits 6e and 6f, respectively.

FIG. 14A is a graph showing input-to-output characteristics for CV circuit 6e. In FIG. 14A, if control signal Vs is changed from high level to low level in a state in which output voltage Vo is so controlled as to be the clamp level minus one base-to-emitter voltage drop (Vf), then the currents I21 and I50 through transistors Q21 and Q50 gradually decrease to zero. In the I21 and I50 decreasing process, a falling of I21 to a threshold level given by Vf/R23 (Vf is the base-to-emitter voltage of Q55) causes transistor Q55 to become off, which in turn causes current I50 to change its course from Q55 to Q54, driving Q54 to conduct. Thereafter, a further falling of I50 to a certain threshold level causes transistor Q54 to become off again.

Consequently, output voltage Vo jumps up to the input voltage Vb at the time of Q54 turning-on in the off state of Q55 and then falls to the NPS level at the time of Q54 turning-off.

If output voltage Vo jumps up to the input voltage Vb even for a moment as described above and if the load includes devices of low withstand voltage, then the load may be damaged by the excessive voltage. Also, noises due to the sudden rise in voltage may cause the load to malfunction.

In order to avoid this problem, a resistor R53 may be inserted in between the NPS conductor and the node of the base of Q54 and the collectors of Q50 and Q55 as shown in FIG. 13B so that current I50 can flow through the added resistor R53. In this case, the value of R53 is preferably so set that current I50 flows through R53 when Q55 has turned off and the voltage drop across R53 (=I50×R53) is lower than a level necessary for turning on transistor Q54. In other words, the value of R53 is preferably so set as to satisfy the relation: I21·R23>I50·R53. That is, R53<(I21/I50)·R23, where I21/I50 is referred to as "collector ratio" of transistors Q21 and Q50. If the collector ratio I21/I50 is denoted as "m", then R53 is set to a value smaller than m·R2.

Figure 14B:
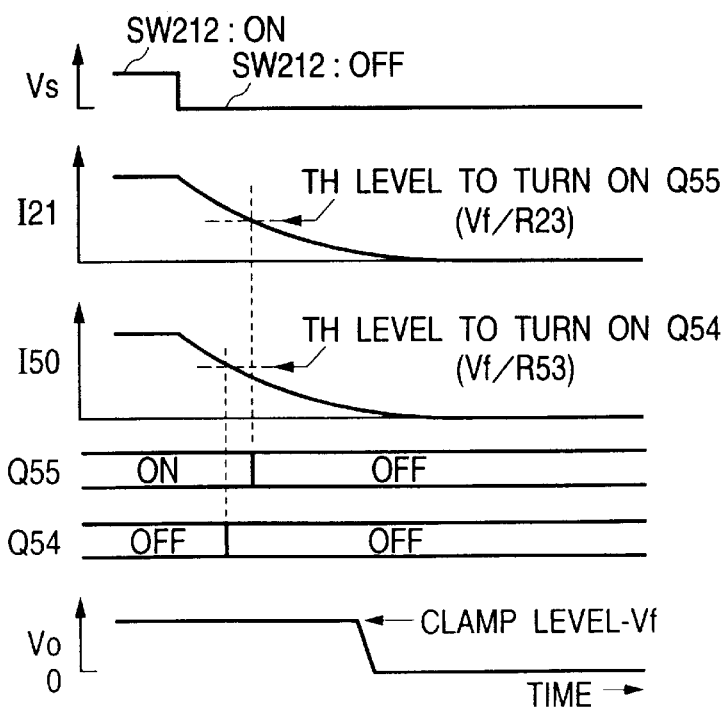

By doing this, it is possible to make an arrangement that the threshold of I50 to turn on Q54 is higher than the threshold of I21 to turn on Q55. Since transistor 54 is maintained off even after transistor Q55 has become off as currents I21 and I50 decreases in magnitude, output voltage Vo is prevented from rising to the input voltage Vb as shown in FIG. 14B.

It is noted that the same sleep function may be added to any of CV circuits 6, 6a–6d described above by providing the constant current circuit thereof with a switching circuit like 212. However, only adding a switching circuit 212 to CV circuit of FIGS. 9A or 9B causes the same problem as in case of CV circuit 13A. It is preferred to also add resistor R53 in case of CV circuit of FIG. 9A or 9B.

The foregoing merely illustrates the principles of the invention. Thus, many variations are possible.

For example, only bipolar transistors have been used for the transistors in the above embodiment. However, a part or the whole of transistors may be replaced with MOS FETs.

Specifically, NPN-type transistor Q1a may be replaced with an N-channel MOS FET with its drain connected to the PPS conductor and with its source connected to the load. In this case, since the threshold voltage to operate an N-channel MOS FET, i.e., the gate-to-source voltage is about 1.0 V, supplying output voltage Vo through the N-channel MOS FET involves a voltage drop more than the threshold voltage. Applying the present invention to a CV circuit which uses an N-channel MOS FET for output transistor Q1a enables output voltage Vo to be raised by about 1.0 V in the low Vb operation.

Also, PNP-type transistor Q2 for providing a substitute power feeder path may be replaced with a P or N-channel MOS FET with its source connected to the PPS conductor and with its drain connected to the load. However, if an N-channel MOS FET is to be used, then in order to drive the N-channel FET it is necessary to apply to the gate thereof a voltage higher than input voltage Vb by the threshold voltage. For this purpose, a charge pump is necessary to obtain a higher voltage from input voltage Vb.

Figure 15:
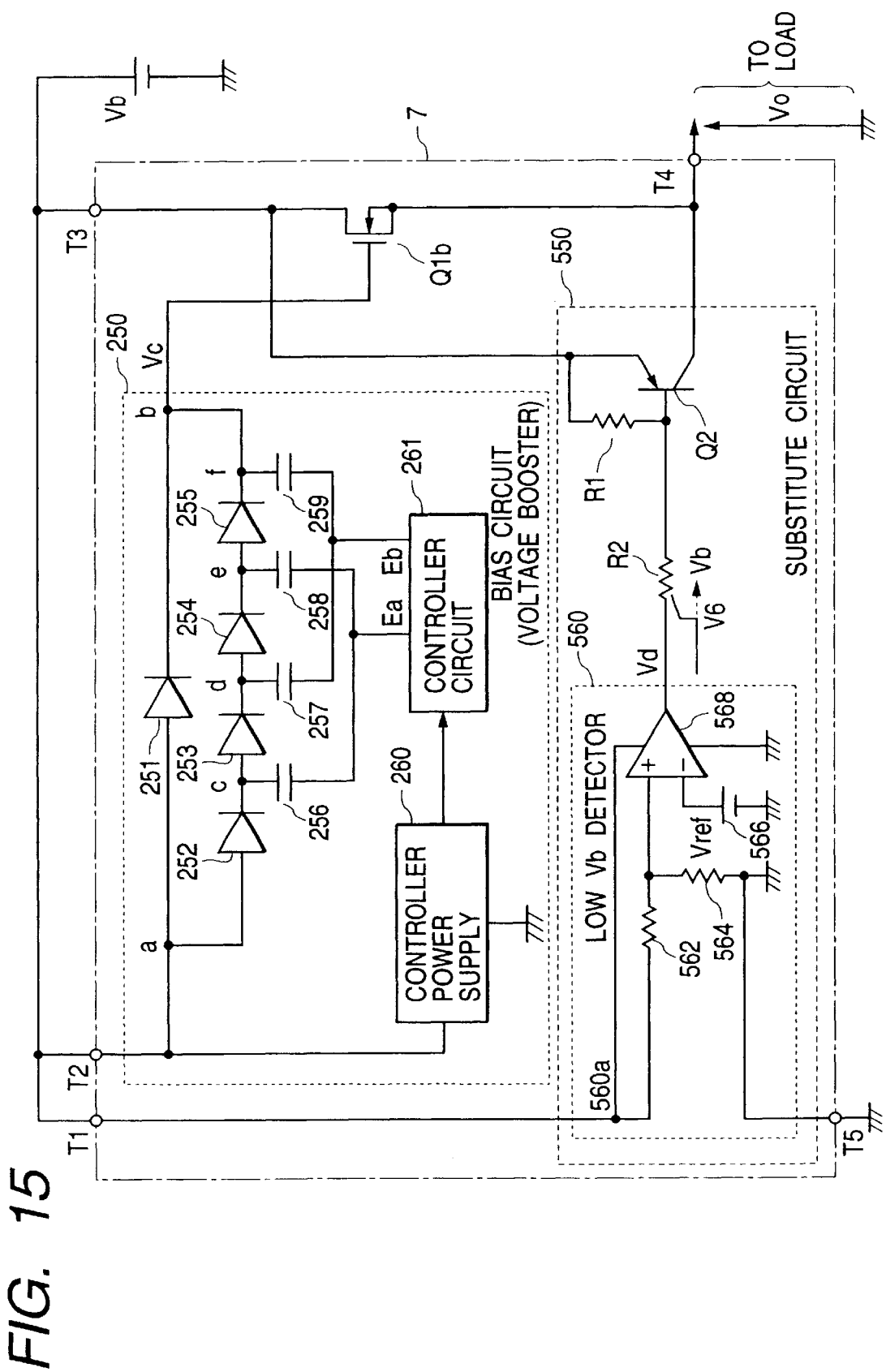
FIG. 15 is a diagram showing an exemplary arrangement of a CV circuit of type II which uses N-type MOSFET as an output transistor Q1b in accordance with a second illustrative embodiment of the invention.

FIG. 15 is a diagram showing an exemplary arrangement of a constant voltage (CV) circuit of type II, which uses N-type MOS FET as an output transistor Q1b, in accordance with a second illustrative embodiment of the invention. The outermost rectangular drawn in a single-dot chain line indicates that the CV circuit 7 is implemented in an integrated circuit (IC) for use in a vehicle. Circuit 7 is supplied with a power supply voltage Vb through IC pins T1–T3. The ground of circuit 7 is connected to the chassis of the vehicle through IC pin T5. The output voltage of the CV circuit 7 is supplied to the load through IC pins T4 and T5.

Figure 2:
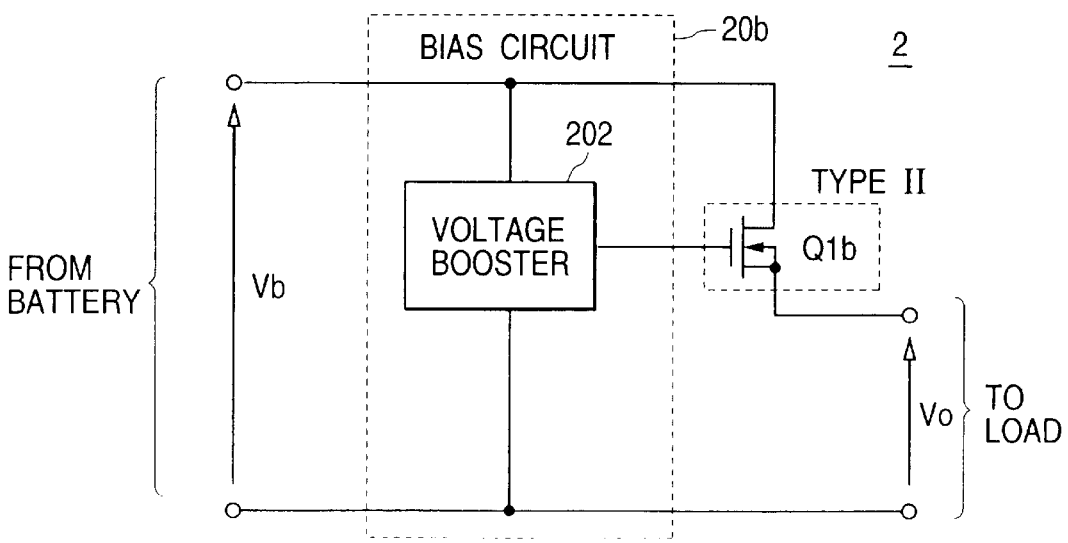

Since CV circuit 7 is obtained by applying the concept of the invention shown in FIG. 3 to a CV circuit of type II shown in FIG. 2, we describe CV circuit 7 taking FIGS. 2 and 3 into account. In FIG. 15, the output transistor Qb1 shown in FIG. 2 has its drain connected to an external battery Vb through IC pin T3 and its source connected to the not-shown load through IC pin T4; the bias circuit 20b has been replaced with a bias circuit 250; and the substitute circuit 50 has been replaced with a substitute circuit 550.

The bias circuit or voltage booster 250 comprises diodes 251 through 255, capacitors 256 through 259; a controller circuit 261 and a controller power supply 260 for supplying a constant voltage (of 5V for example) to the controller circuit 261. Specifically, one diode 251 and four serially connected diodes 252 through 255 are parallelly connected to between a power intake conductor 250a and an output conductor 250b of the bias circuit 250 with their anodes directed to the power intake conductor 250a. The power intake conductor 250a is further connected to the input voltage conductor of the controller power supply 260 and to the external battery Vb through IC pin T2. The output conductor 250b is further connected to the gate of transistor Q1b. Two serially connected capacitors 256 and 258 have their one end connected to the node between diodes 252 and 253 and the other end connected to the node between diodes 254 and 255. Similarly, two serially connected capacitors 257 and 259 have their one end connected to the node between diodes 253 and 254 and the other end connected to the output conductor 250b. The two output conductors Ea and Eb of the controller circuit 261 are connected to the node between the serially connected capacitors 256 and 258 and the node between the serially connected capacitors 257 and 259.

The substitute circuit 550 comprises the above-described PNP transistor Q2 shown in FIG. 3; resistor R1 connected between the base and the collector of transistor Q2; resistor R2 having its one end connected to the node between R1 and the base of Q2; and a low Vb detector 560 having its power intake conductor 560a connected to the external battery Vb through IC pin T1 and its output connected to the other end of resistor R2. The low Vb detector 560 comprises two serially connected dividing resistors 562 and 564 having resistor 562's open end connected to the power intake conductor 560a and resistor 564's open end connected to ground; a comparator 568 having its non-inverting input connected to the node between the resistors 562 and 564 and its output, as the output of the low Vb detector 550, connected to resistor R2; and a reference voltage (Vref) generator 566 having its anode connected to the inverting input of the comparator 568 and its cathode connected to ground through IC pin T5.

Figure 16A:
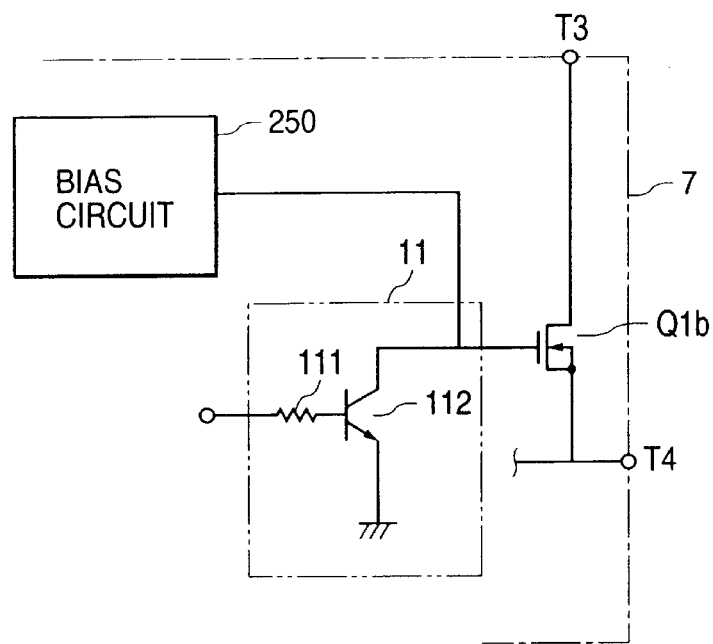
FIGS. 16A and 16B are diagrams showing exemplary switching circuits usable in the CV circuit 5 of FIG. 15.
Figure 16B:
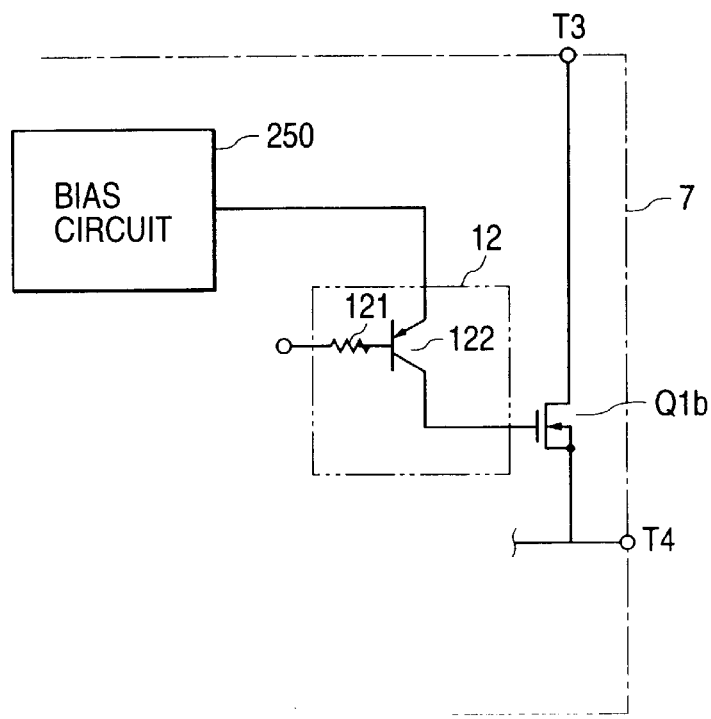

It is noted that though the output conductor 250b of the voltage booster 250 is directly connected to the gate of Q1b, either of switching circuits 11 and 12 shown in FIGS. 16A and 16B may be inserted between them; thereby ensuring the switching operation of Q1b.

Figure 17:
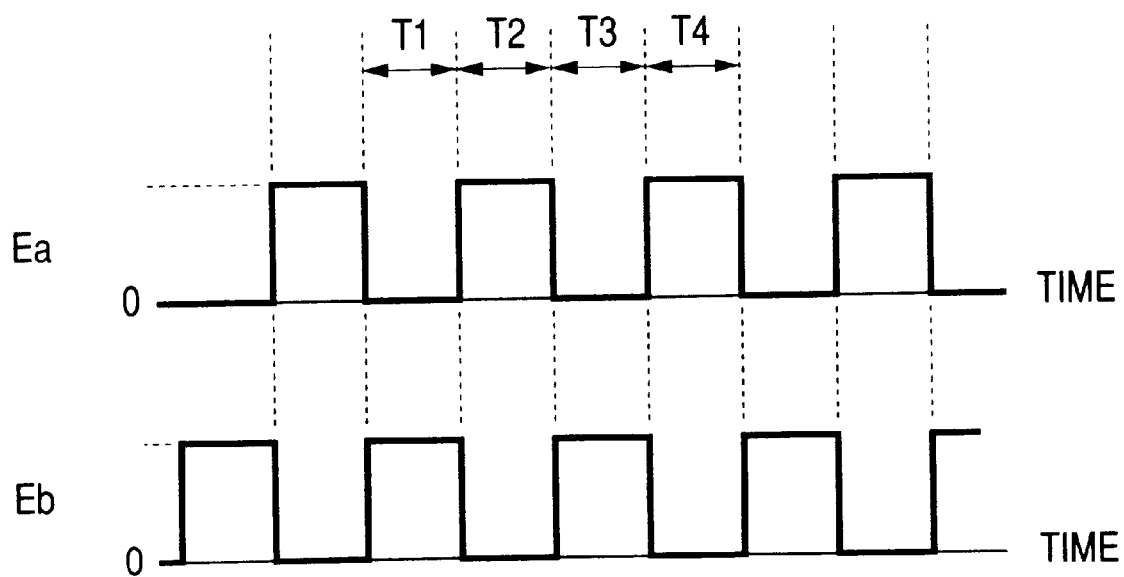
FIG. 17 is a timing chart showing the output signals Ea and Eb of a controller circuit 261 shown in FIG. 15.

In the bias circuit or voltage booster 250, the controller power supply 260 generates a constant voltage of 5V from the battery voltage Vb if Vb is more than 5 V. On the constant voltage from the power supply 260, the controller circuit 261 generates two pumping control signals Ea and Eb. The pumping control signals Ea and Eb have predetermined frequency and amplitude, a duty cycle of 50%, and respective phases inverted to each other as shown in FIG. 17.

Applying the control signals Ea and Eb to the diode and capacitor network 251 through 259 enables the network 251 through 259 to generate a voltage Vc sufficiently higher than the battery voltage Vb as is well known in the art.

Generally speaking, the source-to-drain voltage and the drain current, which flows through the load, are determined according to static characteristics of Q1b based on the gate-to-source voltage. A suitable gate-to-source voltage can make the source-to-drain voltage substantially zero in the linear region (i.e., the output voltage Vo of CV circuit 7 is substantially equal to the battery voltage Vb in this state). This state is referred to as "completely-on" state. Assuming that the minimum gate-to-source voltage that can make Q1b in the completely-on state is VT, then it is necessary for the bias circuit 250 to generate a voltage Vc higher than the battery voltage Vb by more than VT.

Figure 18:
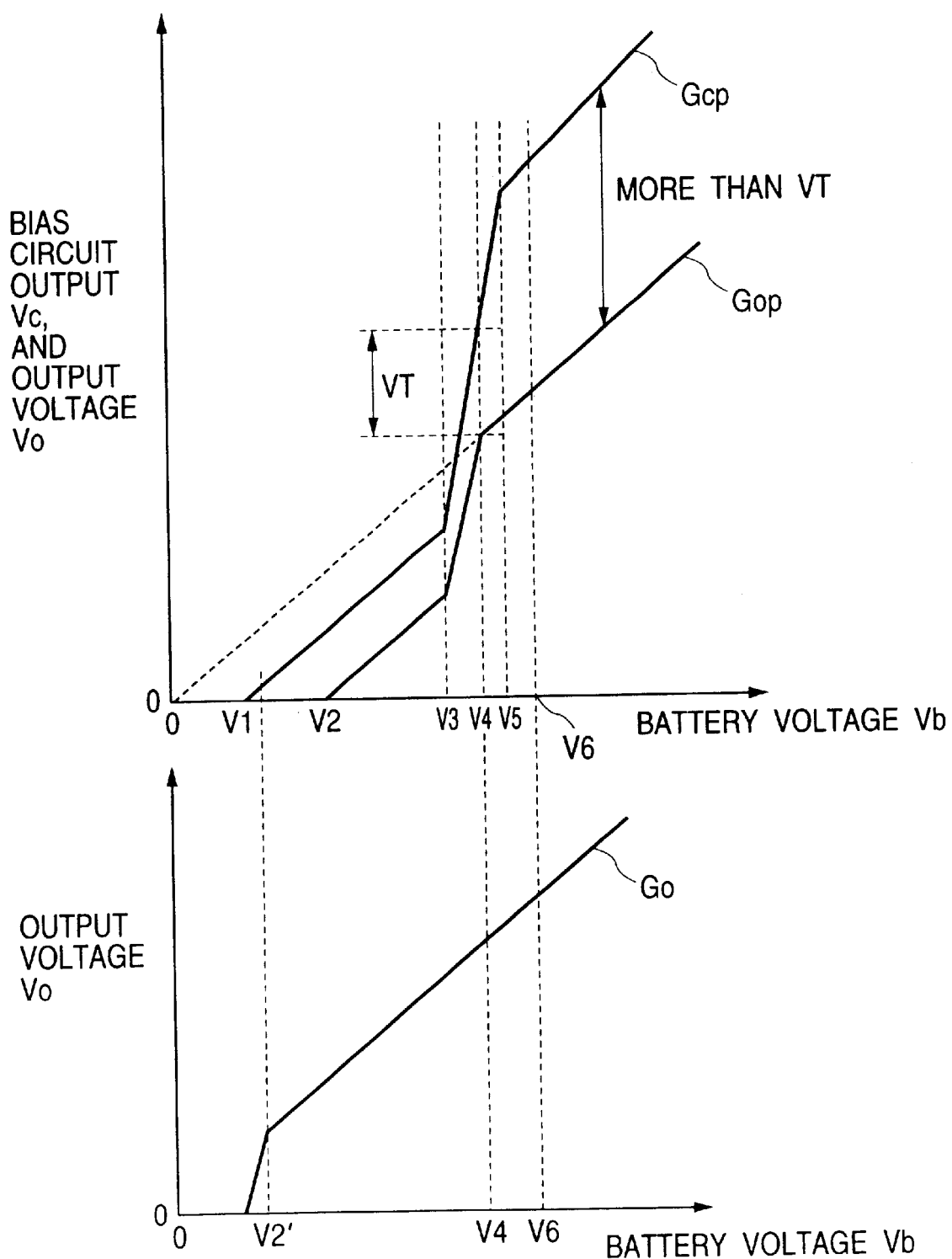
FIG. 18 is a diagram showing graphs to illustrating the effect of the CV circuit 5 of FIG. 15.

However, as the battery voltage Vb decreases, the bias circuit 250 decreases in the output voltage Vc to stop its pumping operation eventually as shown in FIG. 18. In FIG. 18, the abscissa indicates the battery voltage in either of upper and lower graphs, the ordinate of the upper graph indicates bias circuit output Vc and the CV circuit 7 output voltage Vo, and the ordinate of the lower graph indicates the CV circuit 7 output voltage Vo.

We first discuss how a CV circuit with substitute circuit 550 removed from the circuit 7 would operate with variations of the battery voltage Vb. Curves labeled "Gcp" and "Gop" indicates the variations in bias circuit output Vc and CV circuit output Vo, respectively in the upper graph.

If battery voltage Vb is higher than V5 (e.g., 5 V), then bias circuit 250 operates normally and generates a voltage Vc higher than battery voltage Vb by VT as shown in the upper graph. In this state, the higher Vb rises, the larger the magnitude of voltage boosting (i.e., Vc–Vb) becomes as shown in the upper graph.

If battery voltage Vb lowers below 5 V, the output voltage of controller power supply 260 lowers. This causes the amplitudes of the controller circuit 261 output signals Ea and Eb to lower, which in turn the amount of electric charges transferred between adjacent capacities (i.e., the magnitude of voltage rise in each transfer) decreases. The decrease in the operation rate of each of the elements (not shown) constituting controller circuit 261 decreases the frequencies of signals Ea and Eb, which decreases the amount of electric charges stored and transferred in a unit time. Due to these factors, the output voltage Vc of bias circuit 250 drastically falls as the battery voltage Vb lowers below V5. When the battery voltage Vb reaches V3, bias circuit or voltage booster 250 stops its operation; i.e., diode 251 is kept on, yielding an output voltage Vc of Vb–Vf If the battery voltage Vb reaches V1 (substantially equal to Vf), then also diode 251 becomes off, yielding an output voltage Vc of 0 V.

In FIG. 18, voltage V4 is the minimum battery voltage that enables bias circuit 250 to output a voltage of Vb+VT. In other words, if battery voltage is not less than V4, MOS FET Q1b is completely on, providing output voltage Vo substantially equal to Vb. If battery voltage Vb is lower than V4 and higher than V3, MOS FET Q1b is incompletely on, yielding output voltage Vo lower than Vb.

On the other hand, curve Go indicates the input-to-output characteristic of CV circuit 7 provided with the substitute circuit 550.

The low Vb detector 560 is so arranged as to provide an output voltage Vd such that Vd is substantially equal to battery voltage Vb for battery voltage Vb>V6 and is zero for battery voltage Vb ÅÖ V6. The voltage V6 is so set as to be higher than the minimum battery voltage V4 that enables bias circuit 250 to output a voltage of Vb+VT. Also, the reference voltage Vref is so set as to satisfy:

$$Vref = V6 \cdot Rb/(Ra+Rb), \quad (1)$$

where Ra and Rb are resistor values of resistors 562 and 654, respectively.

For battery voltage Vb>V6:

The low Vb detector 560 provides a voltage substantially equal to Vb, making transistor Q2 off; and a sufficiently high voltage Vc makes transistor Q1b completely on, yielding an output voltage Vo substantially equal to Vb.

For battery voltage Vb; V4 ÅÖ Vb ÅÖV6:

Low Vb detector 560 provides a voltage Vd of 0 V, making Q2 on; and bias circuit 250 provides a voltage Vc higher than VT, making Q1b on also. The reason why there is provided a period in which both of transistors Q1b and Q2 is that the pumping characteristic of voltage booster 250 and static characteristics of MOS FET Q1b vary with the temperature and with every CV circuit 7, which causes the value of voltage V4 to vary. For this reason, the voltage V6 is preferably set larger than the possible maximum value of V4.

For battery voltage Vb; V2' ÅÖ Vb ÅÖV4:

Since low Vb detector provides a voltage Vd of 0V, the battery voltage Vb of this range can make transistor Q2 on. In this state, the collector-to-emitter voltage is the saturation voltage causing output voltage Vo to be substantially equal to Vb. Not only because the output Vc of bias circuit 250 lowers below Vb+VT but because the output voltage Vo or the source potential of Q1b is maintained substantially at the battery voltage Vb by transistor Q2, transistor Q1b drastically decreases in its gate-to-source voltage to become off.

For battery voltage Vb<V2':

Low Vb detector cannot operate at this range of battery voltage Vb, and accordingly cannot drive transistor Q2 to conduct. That is, both transistors Q1b and Q2 are off.

As described above, though transistor Q1b becomes incompletely on for battery voltage Vb<V4, low Vb detector 560 detects the lowering of battery voltage Vb under the voltage V6 which is set higher than V4 to turn on transistor Q2.

Even if battery voltage Vb is lower than the minimum battery voltage V4 to turn on Q1b completely, low Vb detector 560 can make transistor Q2 in a sufficiently-on state or saturated on state, providing the output voltage Vo substantially equal to Vb. Also, since transistor Q2 is saturated on, the device loss or collector loss can be reduced to a low level.

Figure 19:
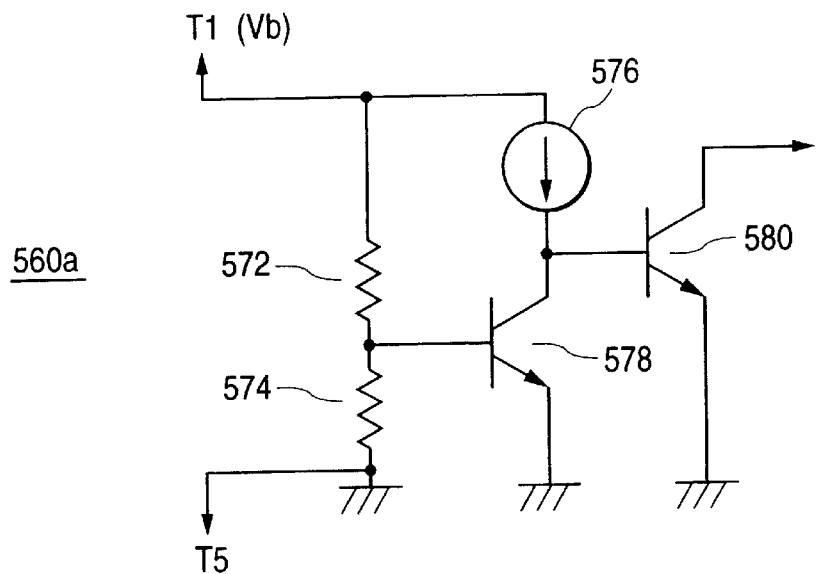
FIG. 19 is a diagram showing another exemplary low Vb detector substitutable for that 560 of FIG. 15.

FIG. 19 is a diagram showing another exemplary low Vb detector substitutable for that 560 of FIG. 15. In FIG. 19, the low Vb detector 560a comprises serially connected resistors 572 and 574 connected to between IC pin T1 and IC pin T5; an NPN transistor 578 having its base connected to the node between resistors 572 and 574, its emitted connected to ground; a constant current source 576 having its anode connected to IC pin T1; and a NPN transistor 680 having its base connected to the collector of transistor 578 and the cathode of constant current source 576, it emitter connected to ground and its collector treated as the output conductor of low Vb detector 560a.

In this configuration, the values of resistors 572 and 574 are so determined as to satisfy:

$$Vf = V6 \cdot Rd/(Rc+Rd), \quad (2)$$

where Rc and Rd are the values of resistors 572 and 574, respectively, and Vf is the base-to-emitter voltage of transistor 578.

If battery voltage Vb is higher than V6, then transistor 578 is on to allowing the entire current from constant current source 576 to flow through transistor 578. This makes transistor 580 off, which in turn makes transistor Q2 off. Conversely, if battery voltage Vb is not higher than V6, then transistor Q2 becomes on.

Low Vb detector 560a can be used instead of circuit 560 in CV circuit 7, yielding the same effects or advantages.

Figure 20:
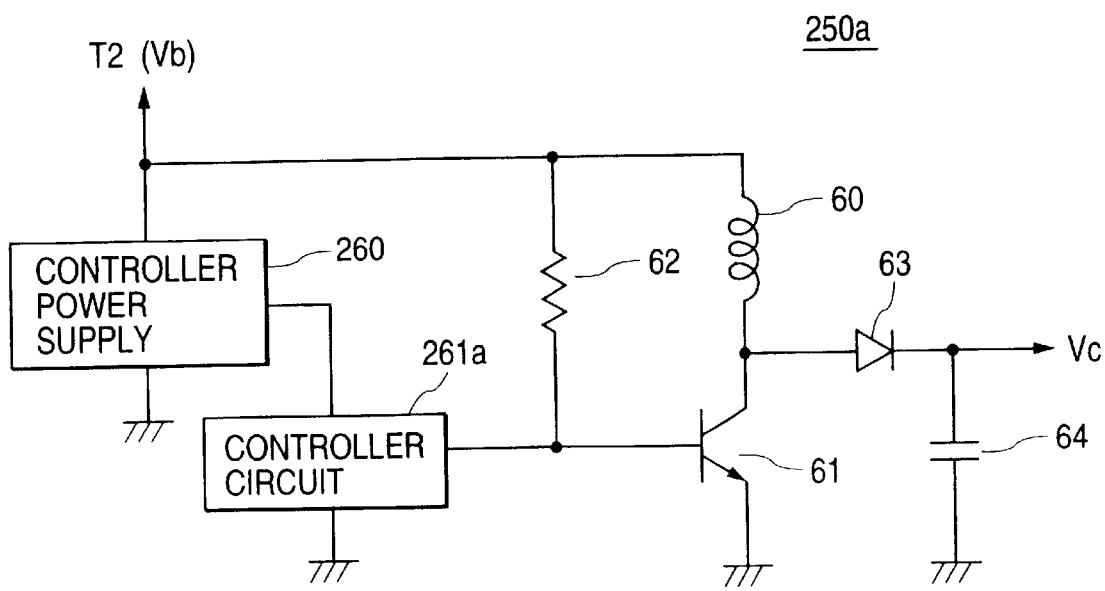
FIG. 20 is a diagram showing another exemplary bias circuit substitutable for that 250 of FIG. 15.

FIG. 20 is a diagram showing another exemplary bias circuit substitutable for that 250 of FIG. 15. In FIG. 15, bias circuit or chopper circuit 250a comprises the controller power supply 260; a controller circuit 261a for providing a control signal; a resistor 62 having one end connected to IC pin T2; a transistor 61 having its emitter connected to ground and its base connected to the other end of resistor 62 and the output of controller circuit 261a; a coil having one end connected to IC pin T2 (Vb); a diode 63 having its anode connected to the other end of coil 60 and the collector of transistor 61; and a capacitor 64 having one end connected to ground and the other end thereof connected to the cathode of the diode 63 and treated as the output conductor of the bias circuit 250a.

In the above configuration, a high-level signal from circuit 261a turns on transistor 61 to allowing a current to flow through coil 60. A subsequent change in the circuit 261a output signal to the low level causes transistor 61 to become off, which in turn causes the current flowing through coil 60 to change its course from transistor 61 to diode 63 and charge the capacitor 64. Repeating these processes forms a raised voltage Vc in the capacitor 64.

Bias circuit or chopper circuit 250a cab be used instead of circuit 250 in CV circuit 7, yielding the same effects or advantages.

Figure 21:
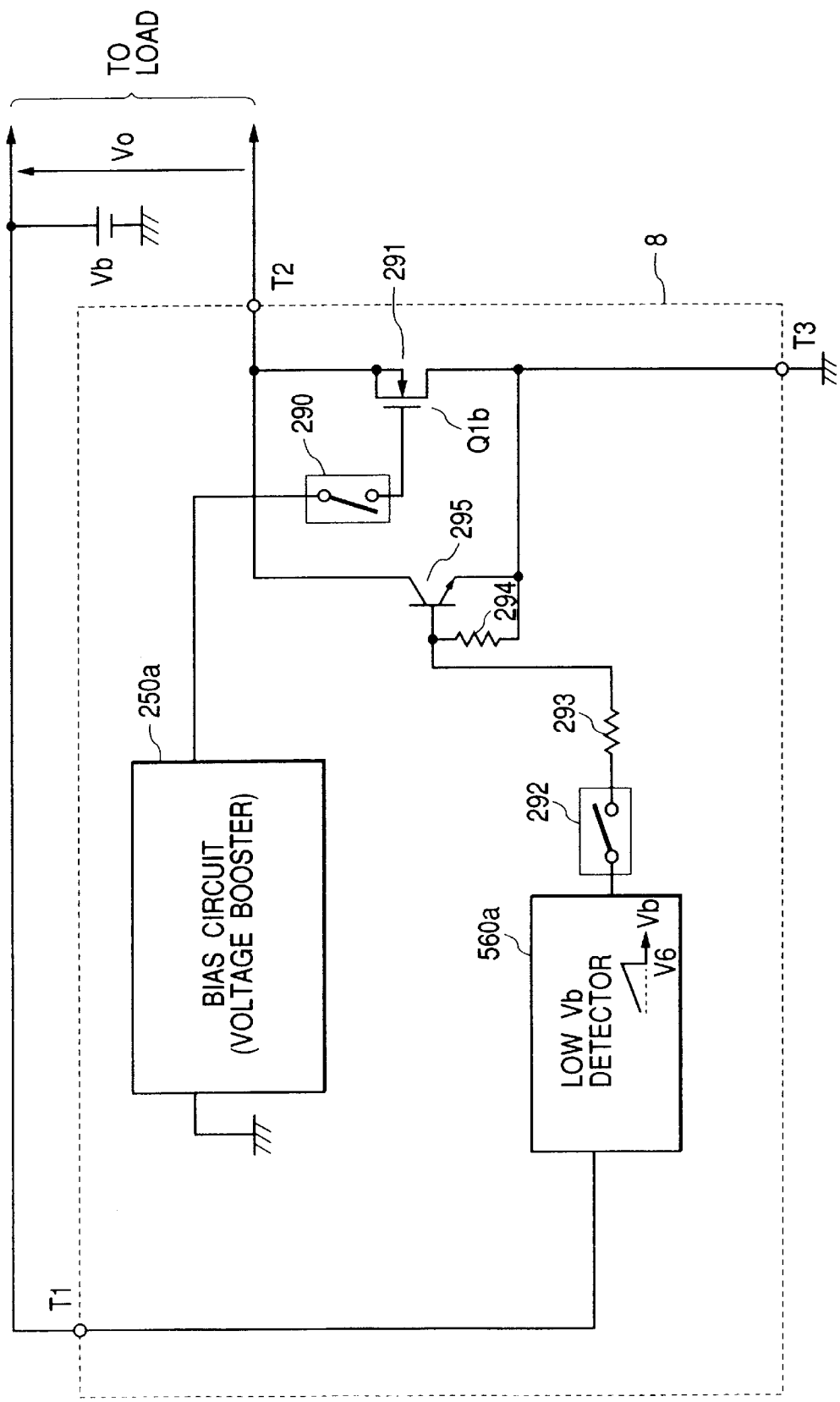
FIG. 21 is a diagram showing an exemplary arrangement of a CV circuit of type II which uses P-type MOSFET as an output transistor Q1b in accordance with the second illustrative embodiment of the invention.

FIG. 21 is a diagram showing an exemplary arrangement of a CV circuit of type II which uses P-type MOSFET as an output transistor Q1b in accordance with the second illustrative embodiment of the invention. It is noted that the CV circuit 8 is obtained by applying the concept of the invention as shown in FIG. 4 to CV 4 circuit of type II shown in FIG. 2.

Though CV circuit 8 of FIG. 21 is basically the same as CV circuit 7 of FIG. 15, they differ from each other in the following points. In FIG. 21, switching circuits 290 and 292 has been added to ensure the switching of transistors 291 and 295, respectively; bias circuit 250 has been replaced with circuit 250a; and low Vb detector 560 has been replaced with circuit 560a.

Bias circuit 250a is so arranged as to generate a negative voltage -VT enough to drive transistor 291 to conduct.

Low Vb detector 560a is so arranged as to generate a voltage of 0 V for battery voltage Vb>V6 and to generate a voltage substantially equal to battery voltage Vb for battery voltage Vb≦V6.

If battery voltage Vb lowers below V6 which is set lower than the minimum battery voltage V4 that turns completely on MOS FET 291, then transistor 295 is turned on to provide the output voltage Vo substantially equal to Vb. This is also true even when battery voltage Vb lowers below V4.

Many widely different embodiments of the present invention may be constructed without departing from the spirit and scope of the present invention. It should be understood that the present invention is not limited to the specific embodiments described in the specification, except as defined in the appended claims.

What is claimed is:

1. A constant voltage circuit fed with a first voltage through a positive power conductor and a ground conductor for supplying a second voltage to a load, the constant voltage circuit including:

an output transistor having a control electrode and having first and second channel electrodes constituting a primary output path to said load by having said first channel electrode connected with said ground conductor and said second channel electrode connected with one end of said load, with another end of said load being connected to said positive power conductor;

bias means for providing a bias voltage to said control electrode to turn on said output transistor;

an NPN transistor having an emitter connected to said ground conductor and a collector connected to said second channel electrode of said output transistor and said one end of said load; and means, responsive to a detection of a lowering of said first voltage to a predetermined voltage, for driving said NPN transistor to turn on said NPN transistor to provide a secondary output path connected in parallel with said primary output path, thereby minimizing the degree of lowering of said second voltage due to the lowering of said first voltage.

2. A constant voltage circuit fed with a first voltage through a first and a second power conductor for supplying a second voltage to a load, the constant voltage circuit including:

an output MOS FET having a control electrode and a first and a second channel electrode constituting a primary output path to said load by having said first channel electrode connected with said first power conductor and said second channel electrode connected with one end of said load, with another end of said load being connected to said second power conductor;

bias means for raising a level of said first voltage to provide a bias voltage large enough to completely turn on said MOS FET; and substitute means, responsive to a detection of a lowering of said first voltage to a predetermined voltage, for providing a secondary output path connected in parallel with said primary output path, to thereby minimize a degree of lowering of said second voltage due to the lowering of said first voltage, said substitute means comprising:

a bipolar transistor for providing said secondary output path via an emitter and collector thereof; and means responsive to said detection for driving said bipolar transistor to turn on said bipolar transistor, wherein said predetermined voltage is set to be higher than a minimum value of said first voltage that can completely turn on said output MOS FET.

3. A constant voltage circuit as defined in claim 2, wherein:

said first and said second power electrodes are a positive conductor and a ground conductor, respectively, wherein:

said MOS FET is an N-channel MOS FET, said N-channel MOS FET having a first electrode or a drain connected to said positive conductor and a second electrode or source, as an output conductor, connected to said one end of said load with said another end of said load connected to said ground conductor, and wherein:

said bipolar transistor is a PNP transistor having said emitter connected to said drain of said MOS FET, said collector connected to said source and said one end of said load, and base electrically coupled with said means for driving said bipolar transistor.

4. A constant voltage circuit as defined in claim 2, wherein:

said first and second power electrodes are a positive conductor and a ground conductor, respectively, wherein:

said MOS FET is an P-channel MOS FET, said P-channel MOS FET having its first electrode or drain connected to said ground conductor and its second electrode or source, as an output conductor, connected to said one end of said load; and said another end of said load is connected to said ground conductor, and wherein:

said bipolar transistor is an NPN transistor having said emitter connected to said drain of said MOS FET, said collector connected to said source and said one end of said load, and a base electrically coupled with said means for driving said bipolar transistor.

5. An integrated circuit (IC) for use in an electronic control unit which includes one or more functional circuits, the IC including a constant voltage circuit fed with a first voltage through a positive power conductor and a ground conductor for supplying a second voltage to each of said functional circuits, the constant voltage circuit including:

an output NPN transistor having a collector and an emitter connected with said positive power conductor and one end of each of said functional circuits, respectively, another end of said each of said functional circuits being connected to said ground conductor;

bias means for providing a bias voltage to a gate of said output NPN transistor to turn on said output NPN transistor;

a PNP transistor having an emitter and a collector connected with said positive power conductor and said emitter of said output NPN transistor, respectively; and means, responsive to a detection of a lowering of said first voltage to a predetermined voltage, for driving said PNP transistor to turn on said PNP transistor to provide a substitution output path connected in parallel with said primary output path, to thereby minimize a degree of lowering of said second voltage due to the lowering of said first voltage, wherein said means for driving said PNP transistor includes:

pull-up means connected between said positive power conductor and a base electrode of said PNP transistor;

a second NPN transistor having an emitter coupled with said ground conductor and a collector connected to a node of said pull-up means and said base electrode of said PNP transistor; and circuit means responsive to said detection for supplying a positive-logic control voltage to a base electrode of said second NPN transistor.

6. A constant voltage circuit fed with a first voltage through a positive power conductor and a ground conductor for supplying a second voltage to a load, the constant voltage circuit including:

an output NPN transistor having a collector and an emitter connected with said positive power conductor and one end of said load, respectively, to provide a primary output path for said load with another end of said load being connected to said ground conductor;

bias means for providing a bias voltage to a gate of said output NPN transistor to turn on said output NPN transistor;

a PNP transistor having an emitter and a collector connected with said positive power conductor and said emitter of said output NPN transistor, respectively; and means, responsive to a detection of a lowering of said first voltage to a predetermined voltage, for driving said PNP transistor to turn on said PNP transistor to provide a substitution output path connected in parallel with said primary output path, thereby to minimize the degree of lowering of said second voltage due to the lowering of said first voltage, wherein said means for driving said PNP transistor comprises:

pull-up means connected between said positive power conductor and a base electrode of said PNP transistor;

a second NPN transistor having its emitter coupled to said ground conductor and its collector connected to a node of said pull-up means and said base electrode of said PNP transistor; and circuit means responsive to said detection for supplying a positive-logic control voltage to a base electrode of said second NPN transistor.

7. A constant voltage circuit as defined in claim 6, wherein said bias means further includes:

constant current means having an anode connected to said positive power conductor;

clamping means having an anode and a cathode for clamping an applied voltage applied across said anode and said cathode to a clamp voltage, said anode being connected to a node between a cathode of said constant current means and said gate of said output NPN transistor; and a resistor having one end thereof connected to said ground electrode and the other end thereof connected to said cathode of said clamping means, wherein said means for driving said PNP transistor includes means for detecting said predetermined voltage on the basis of a potential at a node between said clamping means and said resistor.

8. A constant voltage circuit as defined in claim 6, wherein said bias means includes:

constant current means having an anode connected to said positive power conductor; and a plurality of series clamp elements having an anode end connected to a cathode of said constant current means, wherein said means for driving said PNP transistor includes:

first and second series resistors inserted between said positive power conductor and said ground conductor; and means for detecting said predetermined voltage on the basis of a comparison between a first potential at a node between adjacent clamp elements of said plurality of series clamp elements and a second potential at a node between said first and said second series resistors.

* * * * *